US008599347B2

(12) United States Patent
Arasawa et al.

(10) Patent No.: US 8,599,347 B2
(45) Date of Patent: Dec. 3, 2013

(54) DISPLAY DEVICE AND ELECTRONIC DEVICE

(75) Inventors: Ryo Arasawa, Isehara (JP); Hiroyuki Miyake, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 158 days.

(21) Appl. No.: 13/117,601

(22) Filed: May 27, 2011

(65) Prior Publication Data
US 2011/0299003 A1 Dec. 8, 2011

(30) Foreign Application Priority Data

Jun. 4, 2010 (JP) ................................. 2010-129326

(51) Int. Cl.
G02F 1/1343 (2006.01)
(52) U.S. Cl.
USPC ............................ 349/139; 349/143; 349/145
(58) Field of Classification Search
USPC ............................ 349/43, 139, 143–148, 149
See application file for complete search history.

(56) References Cited

U.S. PATENT DOCUMENTS

| 6,794,231 | B2* | 9/2004 | Tokuhiro et al. | 438/155 |
|---|---|---|---|---|
| 6,882,012 | B2 | 4/2005 | Yamazaki et al. | |
| 7,193,593 | B2 | 3/2007 | Koyama et al. | |
| 7,224,339 | B2 | 5/2007 | Koyama et al. | |
| 7,245,332 | B2* | 7/2007 | Kim | 349/54 |
| 7,268,756 | B2 | 9/2007 | Koyama et al. | |
| 7,317,438 | B2 | 1/2008 | Yamazaki et al. | |
| 7,385,579 | B2 | 6/2008 | Satake | |
| 7,425,937 | B2 | 9/2008 | Inukai | |
| 2002/0113934 | A1* | 8/2002 | Aoki | 349/149 |
| 2004/0085504 | A1* | 5/2004 | Kim et al. | 349/149 |
| 2005/0012097 | A1 | 1/2005 | Yamazaki | |

(Continued)

FOREIGN PATENT DOCUMENTS

| JP | 2001-184873 | 7/2001 |
|---|---|---|
| JP | 2002-008377 | 1/2002 |
| JP | 2003-186451 | 7/2003 |

OTHER PUBLICATIONS

Baron et al., "36.4: Can Motion Compensation Eliminate Color Breakup of Moving Objects in Field-Sequential Color Displays?" SID Digest '96: SID International Symposium Digest of Technical Papers, 1996, vol. 27, pp. 843-846.

(Continued)

Primary Examiner — Nathanael R Briggs
(74) Attorney, Agent, or Firm — Eric J. Robinson; Robinson Intellectual Property Law Office, P.C.

(57) ABSTRACT

An object is to provide a display device in which a difference in load capacitance between wirings is reduced in the case where different signals are supplied to plural pixels at the same timing with use of plural wirings; thus, deviation in the grayscale and/or signal delay can be reduced. The display device includes first to N-th (N is a natural number of 3 or larger) data lines for supplying different video signals; and a pixel including a selection transistor connected to one of the first to N-th data lines. The first to N-th data lines intersect with each other so that one of the first to N-th data lines is provided closest to one terminal of the selection transistor and connected to the one terminal of the selection transistor.

12 Claims, 15 Drawing Sheets

(56) References Cited

U.S. PATENT DOCUMENTS

2006/0139552 A1* 6/2006 Ahn .............................. 349/149
2009/0321737 A1 12/2009 Isa et al.
2010/0148177 A1 6/2010 Koyama et al.
2010/0182282 A1 7/2010 Kurokawa et al.
2011/0249037 A1 10/2011 Koyama et al.

OTHER PUBLICATIONS

Kurita et al., "Evaluation and Improvement of Picture Quality for Moving Images on Field-sequential Color Displays," IDW '00: Proceedings of the 17$^{th}$ International Display Workshops, 2000, pp. 69-72.

Taira et al., "A 15" Field-Sequential Display without Color Break-Up using an AFLC Color Shutter," IDW '00: Proceedings of the 17$^{th}$ International Display Workshops, 2000, pp. 73-76.

Jarvenpaa, "7.2: Measuring Color Breakup of Stationary Images in Field-Sequential-Color Displays," SID Digest '04: SID International Symposium Digest of Technical Papers, 2004, vol. 35, pp. 82-85.

* cited by examiner

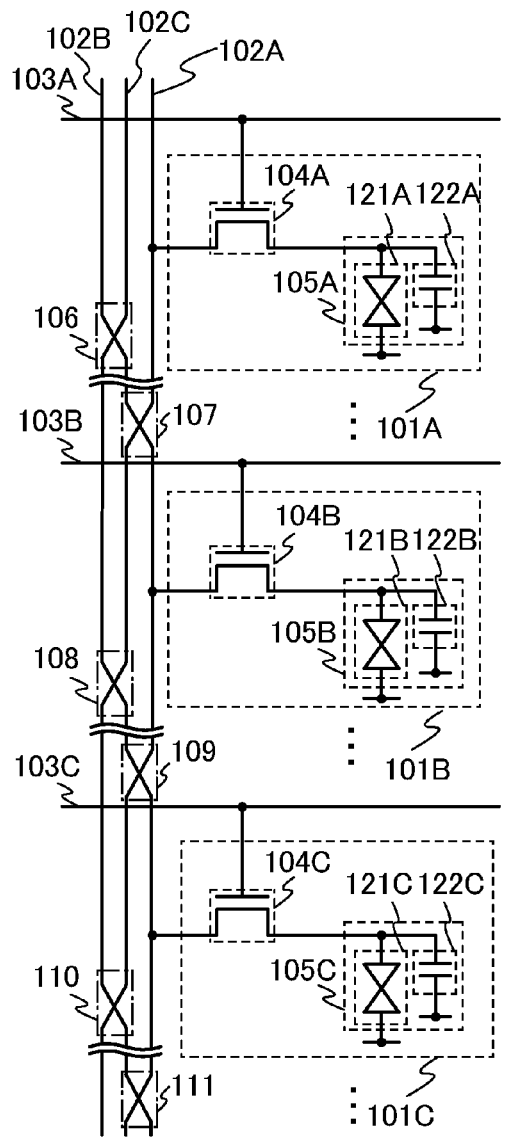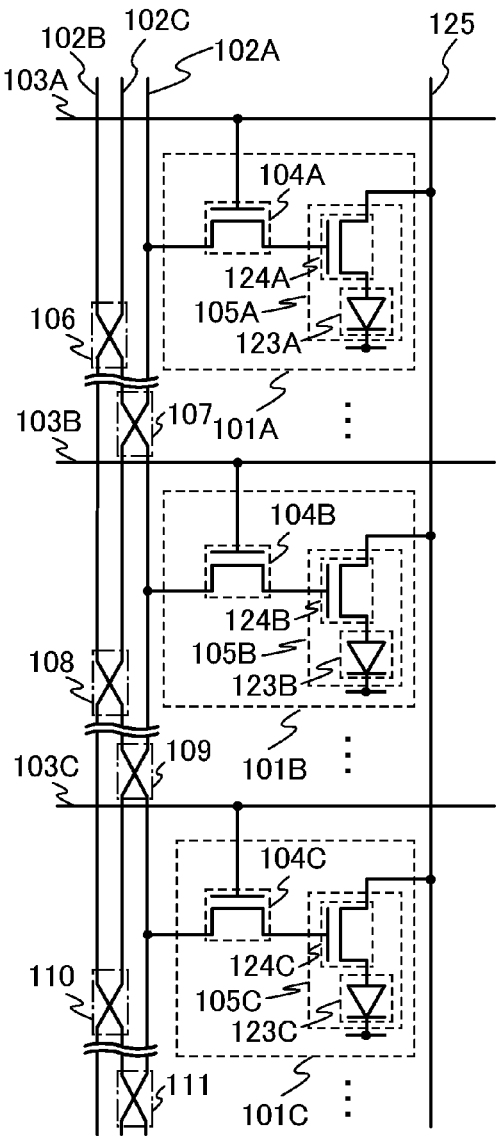

DISPLAY DEVICE AND ELECTRONIC DEVICE

BACKGROUND OF THE INVENTION

1. Field of the Invention

The present invention relates to a display device, a method for driving the display device, or an electronic device provided with the display device.

2. Description of the Related Art

Display devices typified by liquid crystal display devices including liquid crystal elements, ranging from large display devices such as television receivers to small display devices such as cellular phones, have been spreading. From now on, products with higher added values will be needed and are being developed.

In order to add higher values, the number of wirings such as scan lines or data lines which supply signals to each pixel of a display device may be increased so that driving of a pixel is sophisticated. For example, Patent Document 1 discloses a display device provided with a plurality of data lines. In Patent Document 1, the connection between a transistor of a pixel and one of the plurality of data lines is disclosed.

REFERENCE

Patent Document 1

Japanese Published Patent Application No. 2003-186451

SUMMARY OF THE INVENTION

As in Patent Document 1, in the case of increasing the number of wirings such as scan lines or data lines which supply signals to each pixel of a display device, a wiring is extended from a transistor of a pixel to connect with the wiring such as the scan line or the data line which supplies a signal to the pixel. With such a structure, there is a problem in that load capacitance differs between the wirings and thus malfunction in display might occur. The case where load capacitance differs between the wirings will be described below with reference to drawings.

FIG. 15A illustrates a circuit configuration of a pixel included in a display device. FIG. 15A illustrates a circuit configuration in the case where, specifically, three data lines as N (N is a natural number of 3 or larger) data lines (also referred to as signal lines) supply different video signals to three different pixels. A pixel 1501A includes a transistor (also referred to as a selection transistor) 1504A and a display element portion 1505A. In the transistor 1504A of the pixel 1501A, a gate terminal is connected to a scan line 1503A, one terminal (also referred to as a first terminal) to be a source terminal or a drain terminal is connected to a first data line 1502A, and the other terminal is connected to the display element portion 1505A. A pixel 1501B includes a transistor (also referred to as a selection transistor) 1504B and a display element portion 1505B. In the transistor 1504B of the pixel 1501B, a gate terminal is connected to a scan line 1503B, one terminal (also referred to as a first terminal) to be a source terminal or a drain terminal is connected to a second data line 1502B, and the other terminal is connected to the display element portion 1505B. A pixel 1501C includes a transistor (also referred to as a selection transistor) 1504C and a display element portion 1505C. In the transistor 1504C of the pixel 1501C, a gate terminal is connected to a scan line 1503C, one terminal (also referred to as a first terminal) to be a source terminal or a drain terminal is connected to a third data line 1502C, and the other terminal is connected to the display element portion 1505C. The above-described circuit configuration of FIG. 15A is effective in the case where, for example, the transistors 1504A to 1504C are brought into conduction (i.e., the transistors 1504A to 1504C are turned on) by scan signals through the scan lines 1503A to 1503C so that different video signals are supplied to the display element portions 1505A to 1505C through the first to third data lines 1502A to 1502C.

Specific description of display elements in the display element portions 1505A to 1505C is omitted. In the case of a liquid crystal display device, a liquid crystal element and a capacitor may be provided, and in the case of an EL element, a light-emitting element and a transistor for driving the light-emitting element may be provided.

When pixels are arranged in matrix, the first to third data lines 1502A to 1502C are provided in the direction substantially orthogonal to the scan lines 1503A to 1503C, and the pixel 1501A including the transistor 1504A, the pixel 1501B including the transistor 1504B, and the pixel 1501C including the transistor 1504C are provided along the first data line 1502A, the second data line 1502B, and the third data line 1502C, respectively. Thus, in the case where the first to third data lines 1502A to 1502C are provided in parallel to each other, when one terminal of the transistor 1504B is connected to the second data line 1502B, an intersection portion 1506 illustrated in FIG. 15A is formed. Similarly, when one terminal of the transistor 1504C is connected to the third data line 1502C, an intersection portion 1507 illustrated in FIG. 15A is formed. In the intersection portion 1506 and the intersection portion 1507, in order to avoid short-circuit between the first to third data lines 1502A to 1502C, a conductive layer is formed in another layer, whereby, through the conductive layer, the one terminal of the transistor 1504B is connected to the second data line 1502B, and the one terminal of the transistor 1504C is connected to the third data line 1502C.

However, when connection between one terminal of the transistor 1504B and the second data line 1502B and connection between one terminal of the transistor 1504C and the third data line 1502C are formed through the conductive layer, load capacitance 1516 due to the intersection portion 1506 and load capacitance 1517A and 1517B due to the intersection portion 1507 are formed as in FIG. 15B. Specifically, the load capacitance 1516, the load capacitance 1517A, and the load capacitance 1517B differ from each other depending on the area of the intersection portion where the conductive layer intersects with the first to third data lines 1502A to 1502C. Thus, a difference in load capacitance is made between the first data line 1502A and the second data line 1502B, and it is difficult to supply a signal with a desired potential to each pixel. Such a problem causes deviation in the grayscale and/or signal delay.

In view of the above, an object of one embodiment of the present invention is to provide a display device in which a difference in load capacitance between wirings is reduced in the case where different signals are supplied to plural pixels at the same timing with use of plural wirings; thus, deviation in the grayscale and/or signal delay can be reduced.

One embodiment of the present invention is a display device including first to N-th (N is a natural number of 3 or larger) data lines for supplying different video signals; and a pixel including a selection transistor connected to one of the first to N-th data lines, in which the first to N-th data lines intersect with each other so that one of the first to N-th data lines is provided closest to one terminal of the selection transistor and connected to the one terminal of the selection transistor.

In the display device according to one embodiment of the present invention, a display element including a liquid crystal element may be connected to the other terminal of the selection transistor.

In the display device according to one embodiment of the present invention, a display element, including a light-emitting element and a driving transistor for driving the light-emitting element, may be connected to the other terminal of the selection transistor.

The display device according to one embodiment of the present invention may further include a scan line, in which an intersection portion between the first to N-th data lines may be a conductive layer that is the same as the scan line.

In the display device according to one embodiment of the present invention, the first to N-th data lines may have a uniform resistance caused by the conductive layer in the intersection portion.

One embodiment of the present invention is a display device including first to N-th (N is a natural number of 3 or larger) scan lines for supplying different scan signals; and a pixel including a selection transistor connected to one of the first to N-th scan lines, in which the first to N-th scan lines intersect with each other so that the one of the first to N-th scan lines is provided closest to a gate terminal of the selection transistor and connected to the gate terminal of the selection transistor.

In the display device according to one embodiment of the present invention, the one of the first to N-th data lines may be connected to one terminal of the selection transistor, and a display element including a liquid crystal element may be connected to the other terminal of the selection transistor.

In the display device according to one embodiment of the present invention, the one of the first to N-th data lines may be connected to one terminal of the selection transistor, and a display element, including a light-emitting element and a driving transistor for driving the light-emitting element, may be connected to the other terminal of the selection transistor.

According to one embodiment of the present invention, a difference in load capacitance between wirings is reduced; thus, deviation in the grayscale and/or signal delay can be reduced.

BRIEF DESCRIPTION OF THE DRAWINGS

In the accompanying drawings:

FIGS. 2A and 2B are circuit diagrams according to one embodiment of the present invention;

DETAILED DESCRIPTION OF THE INVENTION

Figure 1A:
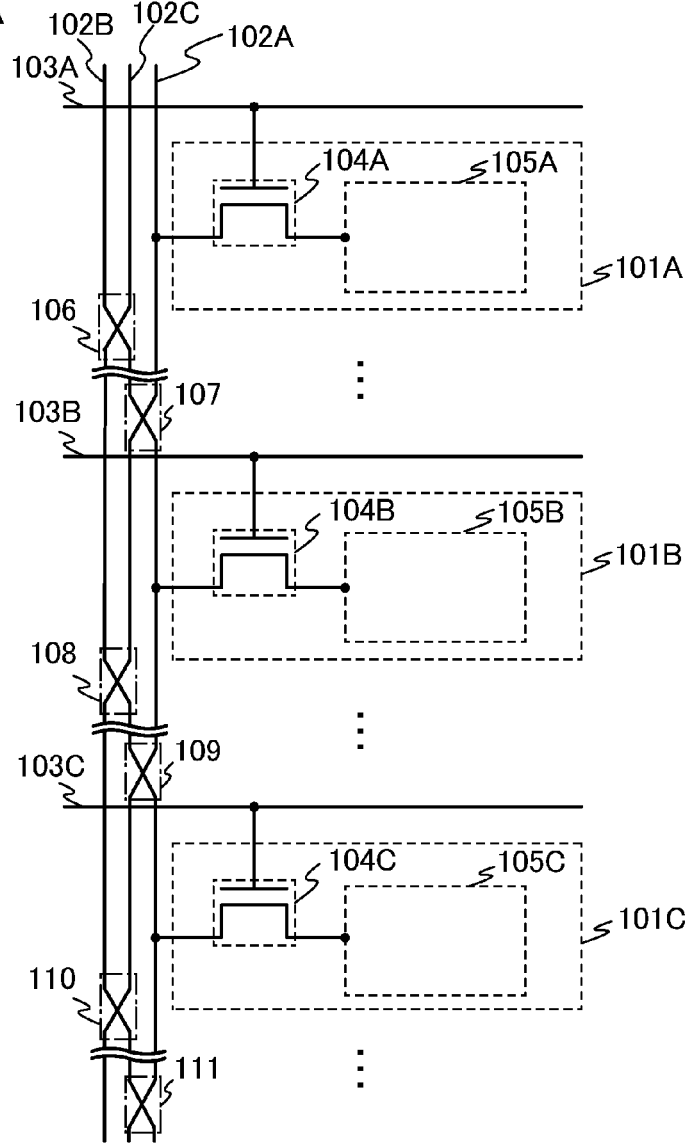
FIGS. 1A and 1B are circuit diagrams according to one embodiment of the present invention.

Hereinafter, embodiments of the present invention will be described with reference to the accompanying drawings. Note that the present invention can be carried out in many different modes, and it is easily understood by those skilled in the art that modes and details of the present invention can be modified in various ways without departing from the spirit and scope of the present invention. Therefore, the present invention is not interpreted as being limited to the description of the embodiments below. Note that identical portions or portions having the same function in all drawings illustrating the structure of the invention that are described below are denoted by the same reference numerals.

Note that the size, the thickness of a layer, a signal waveform, and a region of each structure illustrated in the drawings and the like in the embodiments are exaggerated for simplicity in some cases. Therefore, the embodiments of the present invention are not limited to such scales.

Note that terms such as first, second, third to n-th (n is a natural number) employed in this specification are used in order to avoid confusion between components and do not set a limitation on number.

Embodiment 1

In this embodiment, a circuit configuration of a pixel included in a display device will be described. Note that, a circuit diagram illustrated in this embodiment illustrates an example in which plural wirings for supplying different signals to plural pixels at the same timing are N (N is a natural number of 3 or larger) data lines (also referred to as signal lines), and different video signals are supplied to the plural pixels in response to scan signals of scan lines.

FIG. 1A illustrates a circuit configuration of a pixel included in a display device. FIG. 1A illustrates a circuit configuration in the case where, specifically, three data lines as N (N is a natural number of 3 or larger) data lines (also referred to as signal lines) supply different video signals to three different pixels. A pixel 101A includes a transistor (also referred to as a selection transistor) 104A and a display element portion 105A. In the transistor 104A of the pixel 101A, a gate terminal is connected to a scan line 103A, one terminal (also referred to as a first terminal) to be a source terminal or a drain terminal is connected to a first data line 102A, and the other terminal is connected to the display element portion 105A. A pixel 101B includes a transistor (also referred to as a selection transistor) 104B and a display element portion 105B. In the transistor 104B of the pixel 101B, a gate terminal is connected to a scan line 103B, one terminal (also referred to as a first terminal) to be a source terminal or a drain terminal is connected to a second data line 102B, and the other terminal is connected to the display element portion 105B. A pixel 101C includes a transistor (also referred to as a selection transistor) 104C and a display element portion 105C. In the transistor 104C of the pixel 101C, a gate terminal is connected to a scan line 103C, one terminal (also referred to as a first terminal) to be a source terminal or a drain terminal is connected to a third data line 102C, and the other terminal is connected to the display element portion 105C. The above-described circuit configuration of FIG. 1A is effective in the case where, for example, the transistors 104A to 104C are brought into conduction (i.e., the transistors 104A to 104C are turned on) by scan signals through the scan lines 103A to 103C so that different video signals are supplied to the display element portions 105A to 105C through the first to third data lines 102A to 102C.

Figure 15A:
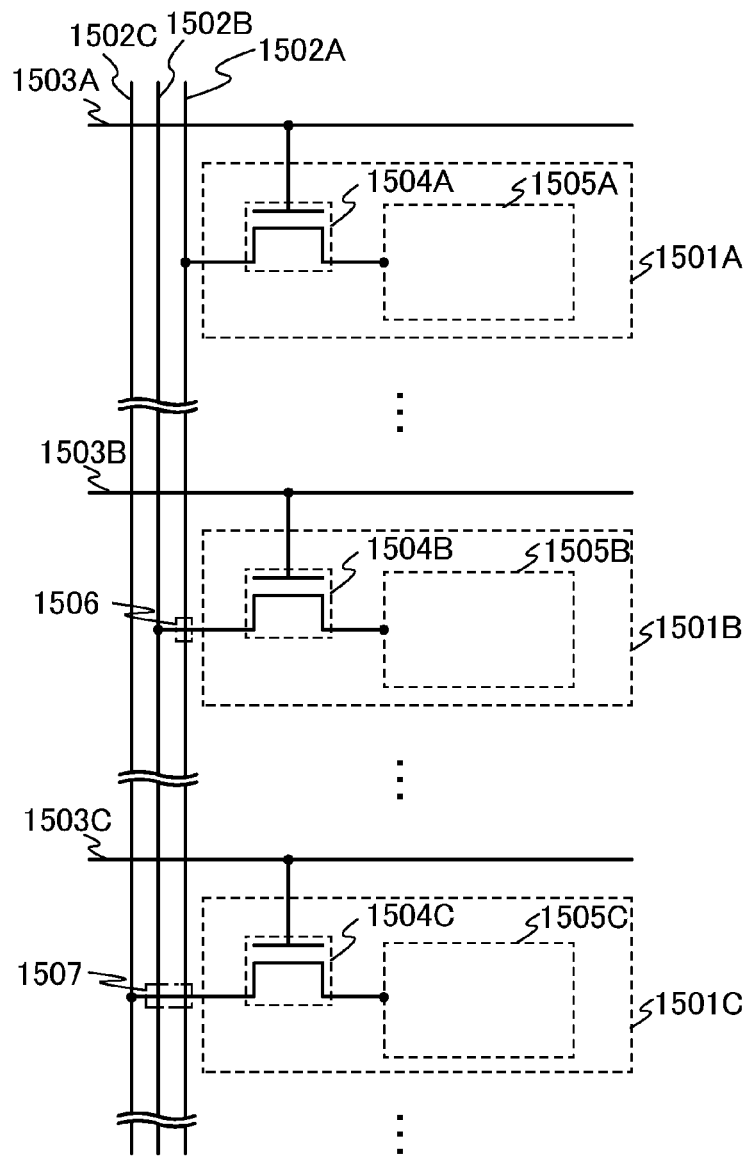
FIGS. 15A and 15B are circuit diagrams for explaining inversion driving.
Figure 15B:
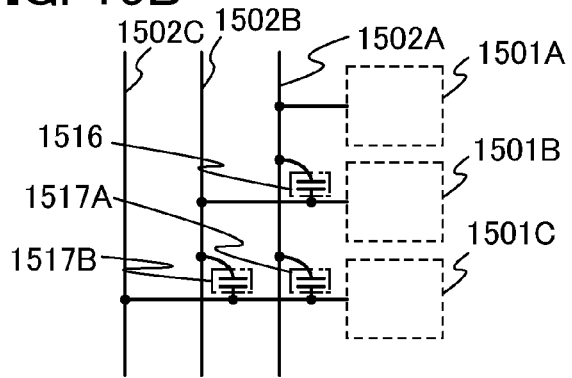

When pixels are arranged in matrix, the first to third data lines 102A to 102C are provided in the direction substantially orthogonal to the scan lines 103A to 103C, and the pixel 101A including the transistor 104A, the pixel 101B including the transistor 104B, and the pixel 101C including the transistor 104C are provided along the first data line 102A, the second data line 102B, and the third data line 102C, respectively. The circuit configuration illustrated in FIG. 1A differs from the circuit configuration illustrated in FIG. 15A in that intersection portions between the first to third data lines 102A to 102C are provided, whereby the first to third data lines 102A to 102C are provided closest to one terminals of the transistors included in the respective pixels 101A to 101C. The one terminal of the transistor is connected to the data line provided closest to the terminal.

Note that a pixel corresponds to a display unit where luminance of a color element (e.g., any one of R (red), G (green), and B (blue)) can be controlled. Therefore, in the case of a color display device, a minimum display unit of a color image is composed of three pixels of an R pixel, a G pixel, and a B pixel. Note that the color elements for displaying color images are not limited to having three colors, and color elements of more than three colors may be used or a color other than RGB may be used.

Note that a transistor is an element having at least three terminals of a gate, a drain, and a source. The transistor includes a channel region between a drain region and a source region, and current can flow through the drain region, the channel region, and the source region. Here, since the source and the drain of the transistor may change depending on the structure, the operating condition, and the like of the transistor, it is difficult to specify which is the source (or the drain). Thus, in this specification, a region functioning as a source or a drain is not called the source or the drain in some cases. In such a case, one of the source and the drain is referred to as one terminal and the other thereof is referred to as the other terminal in some cases. Alternatively, one of the source and the drain may be referred to as a first electrode (terminal) and the other thereof may be referred to as a second electrode (terminal). Further alternatively, one of the source and the drain may be referred to as a source region and the other thereof may be referred to as a drain region. Still further alternatively, one of the source and the drain may be referred to as a source terminal and the other thereof may be referred to as a drain terminal.

Note that, in this specification, the description "A is connected to B" includes a case where A is electrically connected to B in addition to a case where A is directly connected to B. Here, the description "A is electrically connected to B" means, when an object having an electric function is placed between A and B, the case where a portion between A and B, which includes the object, can be considered as a node. Specifically, the description "A is connected to B" means the case where a portion between A and B can be regarded as one node in consideration of circuit operation; for example, the case where A and B are connected through a switching element such as a transistor and have the same or substantially the same potentials by conduction of the switching element, or the case where A and B are connected through a resistor and the potential difference generated at two ends of the resistor does not adversely affect the operation of a circuit including A and B.

Note that voltage refers to a potential difference between a given potential and a reference potential (e.g., a ground potential) in many cases. Accordingly, voltage, potential, and a potential difference can be referred to as potential, voltage, and a voltage difference, respectively.

The structure of a transistor provided in a pixel may be an inverted staggered structure or a staggered structure. Alternatively, a double-gate structure may be used in which a channel region is divided into a plurality of regions and the divided channel regions are connected in series. Alternatively, a dual-gate structure may be used in which gate electrodes are provided over and under the channel region. Further alternatively, a transistor element in which a semiconductor layer forming the transistor is a plurality of island-shaped semiconductor layers to realize switching operation may be used.

In FIG. 1A, an intersection portion 106 is a region where the second data line 102B intersects with the third data line 102C. An intersection portion 107 is a region where the first data line 102A intersects with the second data line 102B. An intersection portion 108 is a region where the first data line 102A intersects with the third data line 102C. An intersection portion 109 is a region where the second data line 102B intersects with the third data line 102C. An intersection portion 110 is a region where the first data line 102A intersects with the second data line 102B. An intersection portion 111 is a region where the first data line 102A intersects with the third data line 102C. The first data line 102A is provided closest to and is connected to one terminal of the transistor 104A without intersection between the one terminal of the transistor 104A and another wiring. The second data line 102B is provided closest to and is connected to one terminal of the transistor 104B without intersection between the one terminal of the transistor 104B and another wiring. The third data line 102C is provided closest to and is connected to one terminal of the transistor 104C without intersection between the one terminal of the transistor 104C and another wiring.

In the intersection portions 106 to 111 illustrated in FIG. 1A, in order to avoid electric short circuit between the first to third data lines 102A to 102C, one of two data lines intersecting with each other is formed of a different conductive layer. In the intersection portions 106 to 111 formed using conductive layers, load capacitance is generated with data lines intersecting with each other. The load capacitance is generated in a region where data lines intersect with each other, that is, a region where a conductive layer which forms the first to third data lines 102A to 102C intersects with the different conductive layer in the intersection portion.

Figure 1B:
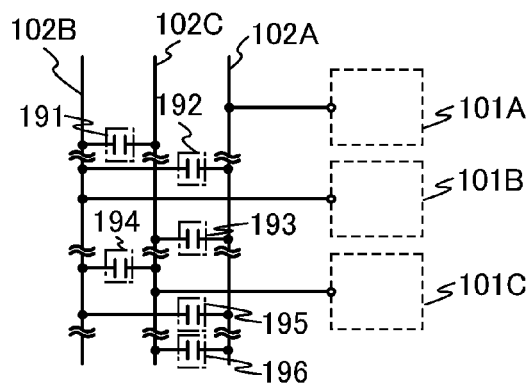

FIG. 1B is a circuit diagram illustrating load capacitance which corresponds to the intersection portions 106 to 111 of the first to third data lines 102A to 102C illustrated in FIG. 1A. In FIG. 1B, as in FIG. 1A, the first data line 102A is connected to the first pixel 101A, the second data line 102B is connected to the second pixel 101B, and the third data line 102C is connected to the third pixel 101C. In FIG. 1B, a capacitor 191 represents load capacitance due to the intersection portion 106 in FIG. 1A, a capacitor 192 represents load capacitance due to the intersection portion 107 in FIG. 1A, a capacitor 193 represents load capacitance due to the intersection portion 108 in FIG. 1A, a capacitor 194 represents load capacitance due to the intersection portion 109 in FIG. 1A, a capacitor 195 represents load capacitance due to the intersection portion 110 in FIG. 1A, and a capacitor 196 represents load capacitance due to the intersection portion 111 in FIG. 1A.

As illustrated in FIG. 1B, load capacitance of the capacitor 192 and the capacitor 195 is generated with the first data line 102A and the second data line 102B; load capacitance of the capacitor 191 and the capacitor 194 is generated with the second data line 102B and the third data line 102C; load capacitance of the capacitor 193 and the capacitor 196 is generated with the first data line 102A and the third data line 102C. As described above, load capacitance is generated in a region where the conductive layer which forms the first to third data lines 102A to 102C intersects with the different conductive layer in the intersection portion. Therefore, in the structure of this embodiment, the widths of the first to third data lines 102A to 102C are made the same; thus, load capacitance can be uniform between the data lines.

Accordingly, in the structure of this embodiment, the areas of the intersection portions formed by the first to third data lines 102A to 102C can be the same, so that load capacitance can be uniform between the data lines. As a result, the first to third data lines 102A to 102C each have uniform load capacitance, whereby a signal with a desired potential can be supplied to each pixel. Accordingly, in a display device, deviation in the grayscale and/or signal delay due to a difference in load capacitance between wirings can be reduced.

Next, examples of specific display elements in the display element portions 105A to 105C illustrated in FIG. 1A will be described with reference to FIGS. 2A and 2B. Note that, in the description of FIGS. 2A and 2B, the structures of the elements illustrated in FIG. 1A other than the display element portions 105A to 105C are not repeatedly described.

A circuit diagram of FIG. 2A illustrates an example of the case where the display element portions 105A to 105C illustrated in FIG. 1A each include a liquid crystal element. The display element portion 105A illustrated in FIG. 2A includes a liquid crystal element 121A and a capacitor 122A which are connected to the other terminal (also referred to as a second terminal) which is to be a source or drain terminal of the transistor 104A. The display element portion 105B illustrated in FIG. 2A includes a liquid crystal element 121B and a capacitor 122B which are connected to the other terminal (also referred to as a second terminal) which is to be a source or drain terminal of the transistor 104B. The display element portion 105C illustrated in FIG. 2A includes a liquid crystal element 121C and a capacitor 122C which are connected to the other terminal (also referred to as a second terminal) which is to be a source or drain terminal of the transistor 104C. One electrode (also referred to as a pixel electrode or a first electrode) of each of the liquid crystal elements 121A to 121C is connected to the other terminal of each of the transistors 104A to 104C, respectively. The other electrode (also referred to as a counter electrode or a second electrode) of each of the liquid crystal elements 121A to 121C is connected to a common potential line (also referred to as a common line). One electrode (also referred to as a first electrode) of each of the capacitors 122A to 122C is connected to the other terminal of each of the transistors 104A to 104C, respectively. The other electrode (also referred to as a second electrode) of each of the capacitors 122A to 122C is connected to a capacitor line. Note that the capacitors 122A to 122C may be provided as necessary, and can be omitted.

A circuit diagram of FIG. 2B illustrates an example of the case where the display element portions 105A to 105C illustrated in FIG. 1A each include a light-emitting element such as an electro luminescent (EL) element. The display element portion 105A illustrated in FIG. 2B includes a light-emitting element 123A and a transistor (also referred to as a driving transistor) 124A for driving the light-emitting element 123A. The display element portion 105B illustrated in FIG. 2B includes a light-emitting element 123B and a transistor (also referred to as a driving transistor) 124B for driving the light-emitting element 123B. The display element portion 105C illustrated in FIG. 2B includes a light-emitting element 123C and a transistor (also referred to as a driving transistor) 124C for driving the light-emitting element 123C. A gate terminal of each of the transistors 124A to 124C is connected to the other terminal of each of the transistors 104A to 104C, respectively. One terminal (also referred to as a first terminal) to be a source or drain terminal of each of the transistors 124A to 124C is connected to a current supply line (also referred to as a power supply line) for supplying current to the light-emitting elements 123A to 123C. The other terminal (also referred to as a second terminal) to be a source or drain terminal of each of the transistors 124A to 124C is connected to one electrode (also referred to as a first electrode) of each of the light-emitting elements 123A to 123C, respectively. The other electrode (also referred to as a second electrode) of each of the light-emitting elements 123A to 123C is connected to a ground line (also referred to as a common potential line). In each of the transistors 124A to 124C, a capacitor may be provided between the gate terminal and the first terminal.

Next, a top view of the circuit diagram illustrated in FIG. 2A in which the display element portions 105A to 105C each include a liquid crystal element is specifically described. The areas of intersection portions formed by the first to third data lines 102A to 102C are the same and thus load capacitance can be uniform between the data lines. Such advantages will be described below.

Figure 3:
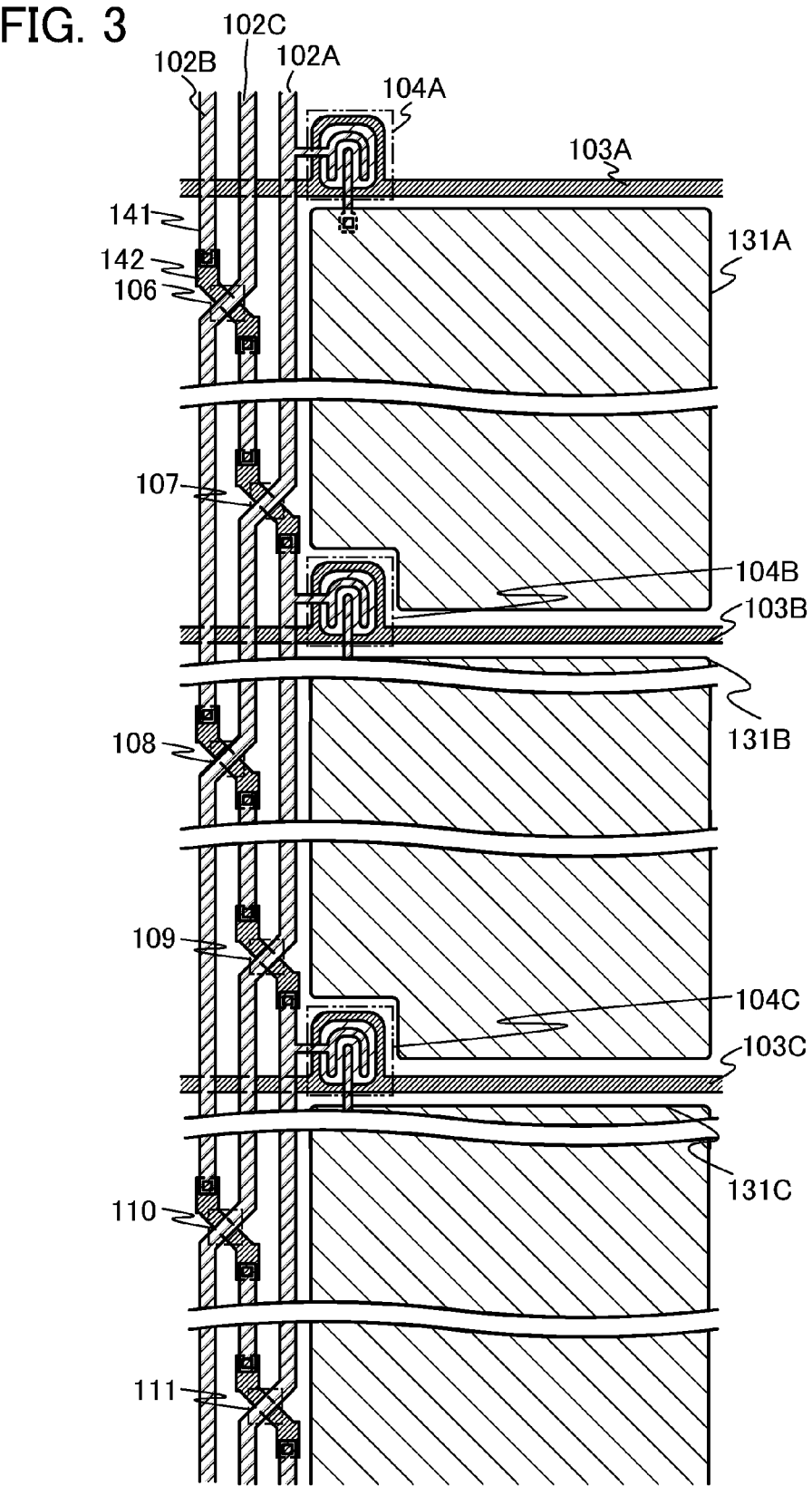
FIG. 3 is a top view according to one embodiment of the present invention.

FIG. 3 is a top view of the circuit diagram illustrated in FIG. 2A. Note that, in FIG. 3, description of the capacitors 122A to 122C illustrated in FIG. 2A is omitted. As the structure corresponding to the liquid crystal elements 121A to 121C, one electrodes (pixel electrodes) 131A to 131C of the liquid crystal elements 121A to 121C are illustrated. The first to third data lines 102A to 102C illustrated in FIG. 3 include a conductive layer (a first conductive layer 141) provided in the direction orthogonal to the scan lines 103A to 103C, and include, in the intersection portions 106 to 111, the conductive layer (a second conductive layer 142) which is the same layer as the scan lines 103A to 103C.

In the top view of FIG. 3, in each of the intersection portions 106 to 111, load capacitance is generated in a region where the first conductive layer 141 overlaps with the second conductive layer 142. Specifically, load capacitance is generated in the intersection portion 106 where the first conductive layer 141 included in the third data line 102C overlaps with the second conductive layer 142 included in the second data line 102B. Load capacitance is generated in the intersection portion 107 where the first conductive layer 141 included in the first data line 102A overlaps with the second conductive layer 142 included in the second data line 102B. Load capacitance is generated in the intersection portion 108 where the first conductive layer 141 included in the first data line 102A overlaps with the second conductive layer 142 included in the third data line 102C. Load capacitance is generated in the intersection portion 109 where the first conductive layer 141 included in the second data line 102B overlaps with the second conductive layer 142 included in the third data line 102C. Load capacitance is generated in the intersection portion 110 where the first conductive layer 141 included in the second data line 102B overlaps with the second conductive layer 142 included in the first data line 102A. Load capacitance is generated in the intersection portion 111 where the first conductive layer 141 included in the third data line 102C overlaps with the second conductive layer 142 included in the first data line 102A. The first to third data lines 102A to 102C have the same number of intersection portions (the intersection portions 106 to 111) formed using the first conductive layer 141 and the second conductive layer 142. Therefore, the widths of the first to third data lines 102A to 102C are made the same, whereby load capacitance can be uniform between the data lines.

Accordingly, in the structure of this embodiment, the areas of the intersection portions formed by the first to third data lines 102A to 102C can be the same, so that load capacitance can be uniform between the data lines. As a result, the first to third data lines 102A to 102C each have uniform load capacitance, whereby a signal with a desired potential can be supplied to each pixel. Accordingly, in a display device, deviation in the grayscale and/or signal delay due to a difference in load capacitance between wirings can be reduced.

Figure 4A:
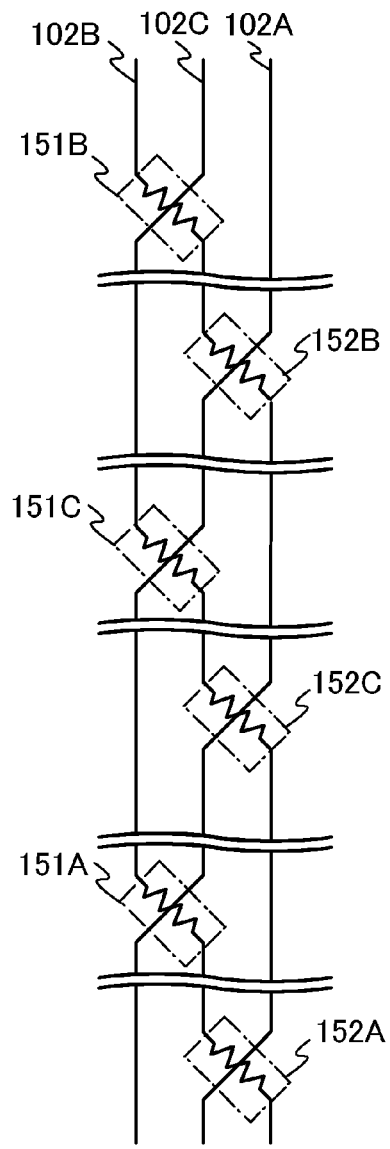
FIGS. 4A and 4B are each a circuit diagram according to one embodiment of the present invention.

In the case where the conductive layer used for the first conductive layer 141 and the conductive layer used for the second conductive layer 142 have different conductivities, wiring resistances of the first to third data lines 102A to 102C illustrated in FIG. 3 might differ from each other. FIG. 4A is a circuit diagram where a resistor corresponds to the second conductive layer 142 in the top view of FIG. 3.

As illustrated in FIG. 4A, the second conductive layer 142 included in the intersection portion 106 in FIG. 3 is represented by a first resistor 151B included in the second data line 102B. The second conductive layer 142 included in the intersection portion 107 in FIG. 3 is represented by a second resistor 152B included in the second data line 102B. The second conductive layer 142 included in the intersection portion 108 in FIG. 3 is represented by a first resistor 151C included in the third data line 102C. The second conductive layer 142 included in the intersection portion 109 in FIG. 3 is represented by a second resistor 152C included in the third data line 102C. The second conductive layer 142 included in the intersection portion 110 in FIG. 3 is represented by a first resistor 151A included in the first data line 102A. The second conductive layer 142 included in the intersection portion 111 in FIG. 3 is represented by a second resistor 152A included in the first data line 102A.

As illustrated in FIG. 4A, the structure of this embodiment can be as follows: the first data line 102A includes the first resistor 151A and the second resistor 152A; the second data line 102B includes the first resistor 151B and the second resistor 152B; the third data line 102C includes the first resistor 151C and the second resistor 152C. Thus, in the structure of this embodiment, the number of resistors included in each of the first to third data lines 102A to 102C can be the same. Therefore, when the second conductive layers 142 included in the first to third data lines 102A to 102C are formed using the same conductive material and have the same width, the first to third data lines 102A to 102C can have the same wiring resistance.

Figure 4B:
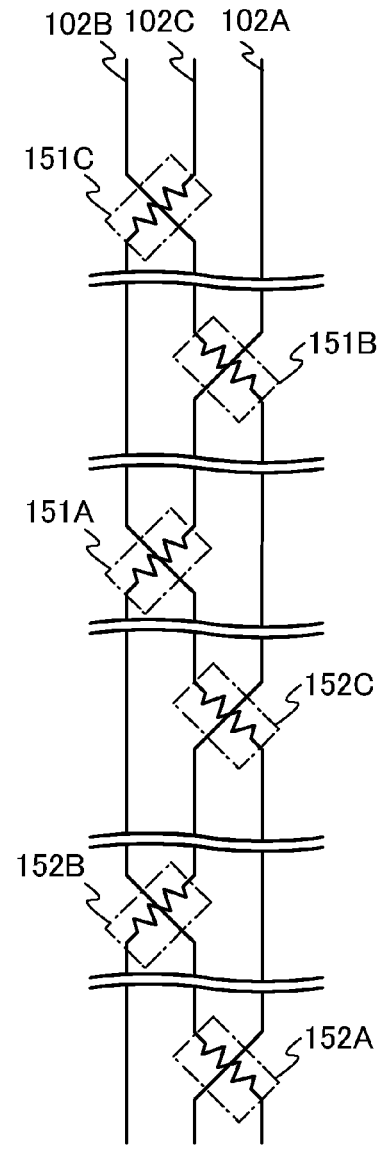

Note that the first resistors 151A to 151C and the second resistors 152A to 152C in the first to third data lines 102A to 102C may be provided anywhere in the first to third data lines 102A to 102C. For example, the second conductive layers 142 to be resistors may be provided so that resistors are provided as in FIG. 4B.

Figure 5:
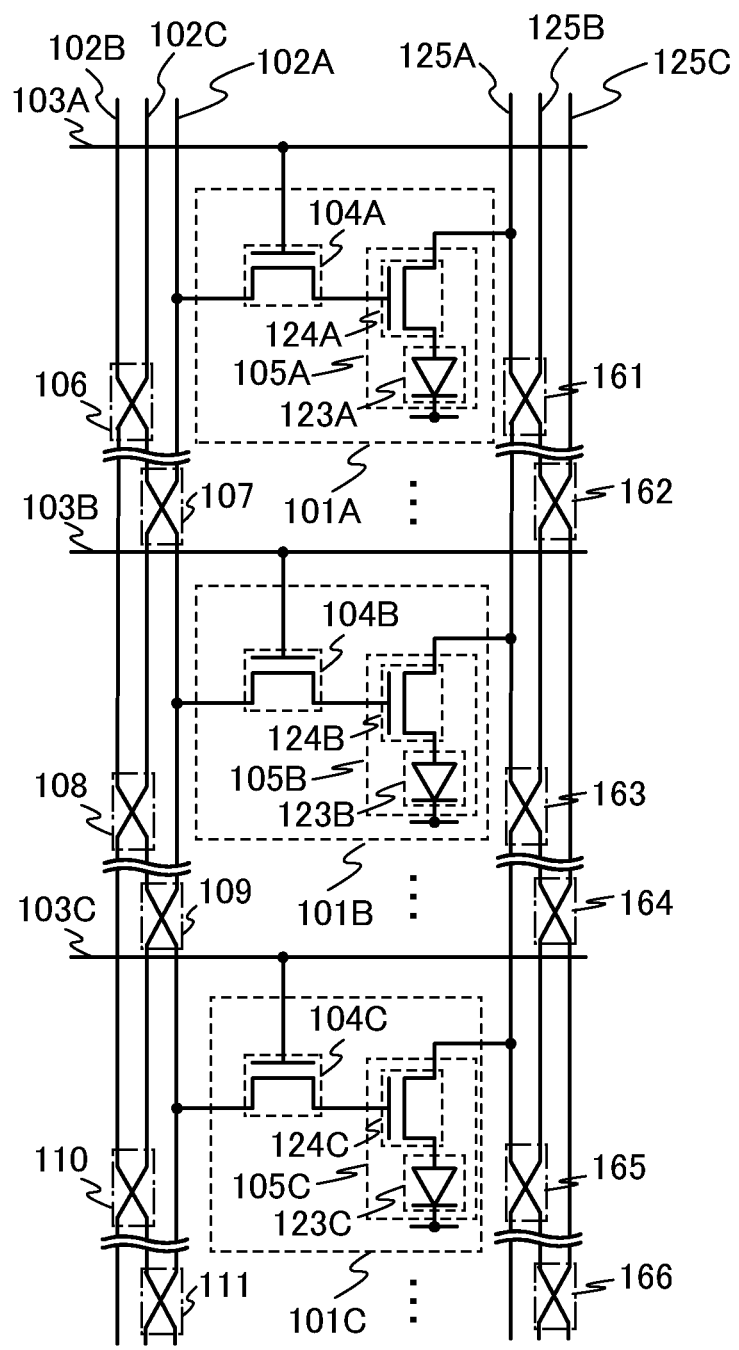
FIG. 5 is a circuit diagram according to one embodiment of the present invention.

Although the structure of the display device including the first to third data lines as plural wirings for supplying different signals to the plural pixels at the same timing is described in this embodiment, another wiring can be used. For example, the current supply line for supplying current to the light-emitting elements 123A to 123C in the structure including light-emitting elements described in FIG. 2B may be divided into a first current supply line 125A, a second current supply line 125B, and a third current supply line 125C as illustrated in FIG. 5, and intersection portions 161 to 166 may be provided. When the intersection portions 161 to 166 are provided in the first current supply line 125A, the second current supply line 125B, and the third current supply line 125C, the first to third current supply lines 125A to 125C are provided closest to one terminals of the transistors 124A to 124C, respectively; thus, the one terminals of the transistors 124A to 124C can be connected to the first to third current supply lines 125A to 125C, respectively, without intersection between the one terminals of the transistors 124A to 124C and another wiring.

In the structure of this embodiment, in a manner similar to that of the first to third data lines 102A to 102C, load capacitance can be uniform between the current supply lines. As a result, the first to third current supply lines 125A to 125C each have uniform load capacitance, whereby a signal with a desired potential can be supplied to each pixel. Accordingly, in a display device, deviation in the grayscale and/or signal delay due to a difference in load capacitance between wirings can be reduced.

As described above, a difference in load capacitance can be reduced between data lines or between current supply lines. As the result, deviation in the grayscale and/or signal delay due to the difference in load capacitance can be reduced.

This embodiment can be implemented in appropriate combination with any of the structures described in the other embodiments.

Embodiment 2

In this embodiment, a structure different from the structure described in Embodiment 1 will be described with reference to FIGS. 6A and 6B and FIGS. 7A and 7B. The structures of this embodiment differs from the structures of FIGS. 1A and 1B and FIGS. 2A and 2B described in Embodiment 1 in that plural scan lines are provided as plural wirings. Specifically, with reference to circuit diagrams, an example where as the plural wirings for supplying different signals to plural pixels at the same timing, N (N is a natural number of 3 or larger) scan lines are provided to supply different scan signals to the plural pixels will be described.

Figure 6A:
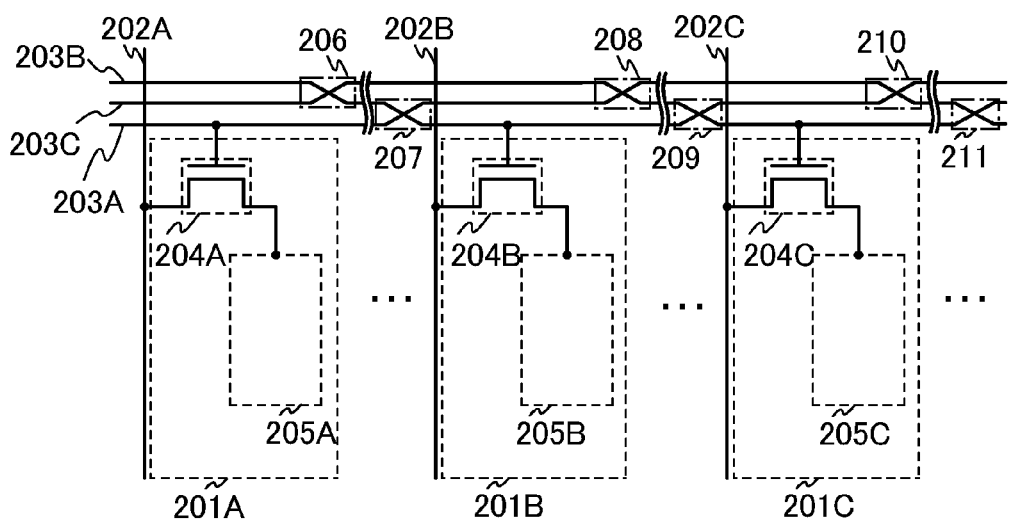
FIGS. 6A and 6B are circuit diagrams according to one embodiment of the present invention.

FIG. 6A illustrates a circuit configuration of a pixel included in a display device. FIG. 6A illustrates a circuit configuration in the case where three scan lines as N scan lines supply different scan signals to three different pixels. A pixel 201A includes a transistor (also referred to as a selection transistor) 204A and a display element portion 205A. In the transistor 204A of the pixel 201A, a gate terminal is connected to a first scan line 203A, one terminal (also referred to as a first terminal) to be a source or drain terminal is connected to a data line 202A, and the other terminal is connected to the display element portion 205A. A pixel 201B includes a transistor (also referred to as a selection transistor) 204B and a display element portion 205B. In the transistor 204B of the pixel 201B, a gate terminal is connected to a second scan line 203B, one terminal (also referred to as a first terminal) to be a source or drain terminal is connected to a data line 202B, and the other terminal is connected to the display element portion 205B. A pixel 201C includes a transistor (also referred to as a selection transistor) 204C and a display element portion 205C. In the transistor 204C of the pixel 201C, a gate terminal is connected to a third scan line 203C, one terminal (also referred to as a first terminal) to be a source or drain terminal is connected to a data line 202C, and the other terminal is connected to the display element portion 205C. Such a circuit configuration illustrated in FIG. 6A is effective in the case where, for example, the transistors 204A to 204C are individually brought into conduction (i.e., the transistors 204A to 204C are turned on) by scan signals through the first to third scan lines 203A to 203C so that video signals are supplied to the display element portions 205A to 205C through the data lines 202A to 202C.

When pixels are arranged in matrix, the first to third scan lines 203A to 203C are provided in the direction orthogonal to the data lines 202A to 202C, and the pixels 201A to 201C including the transistors 204A to 204C, respectively, are provided along the first to third scan lines 203A to 203C. In the circuit configuration illustrated in FIG. 6A, intersection portions between the first to third scan lines 203A to 203C are provided; thus, the first to third scan lines 203A to 203C are provided closest to the respective gate terminals of the transistors included in the pixels 201A to 201C. Then, the gate terminal of the transistor is connected to the scan line closest to the gate terminal.

In FIG. 6A, an intersection portion 206 is a region where the second scan line 203B intersects with the third scan line 203C. An intersection portion 207 is a region where the first scan line 203A intersects with the second scan line 203B. An intersection portion 208 is a region where the first scan line 203A intersects with the third scan line 203C. An intersection portion 209 is a region where the second scan line 203B intersects with the third scan line 203C. An intersection portion 210 is a region where the first scan line 203A intersects with the second scan line 203B. An intersection portion 211 is a region where the first scan line 203A intersects with the third scan line 203C. The first scan line 203A is provided closest to a gate terminal of the transistor 204A, so that the gate terminal of the transistor 204A is connected to the first scan line 203A without intersecting with another wiring. The second scan line 203B is provided closest to a gate terminal of the transistor 204B, so that the gate terminal of the transistor 204B is connected to the second scan line 203B without intersecting with another wiring. The third scan line 203C is provided closest to a gate terminal of the transistor 204C, so that the gate terminal of the transistor 204C is connected to the third scan line 203C without intersecting with another wiring.

In the intersection portions 206 to 211 illustrated in FIG. 6A, in order to avoid electric short circuit between the first to third scan lines 203A to 203C, one of two scan lines intersecting with each other is formed of a different conductive layer. In the intersection portions 206 to 211 formed using conductive layers, load capacitance is generated with scan lines intersecting with each other. The load capacitance is generated in a region where scan lines intersect with each other, that is, a region where a conductive layer which forms the first to third scan lines 203A to 203C intersects with the different conductive layer in the intersection portion.

Figure 6B:
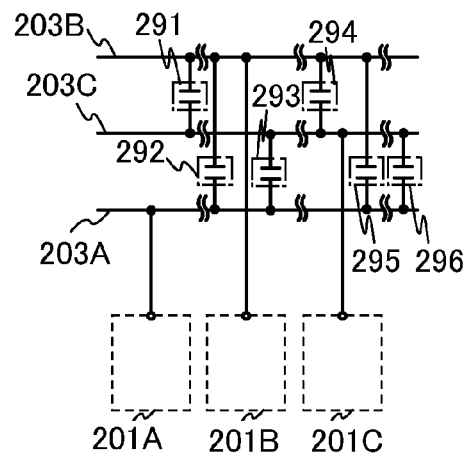

FIG. 6B is a circuit diagram illustrating load capacitance which correspond to the intersection portions 206 to 211 of the first to third scan lines 203A to 203C illustrated in FIG. 6A. In FIG. 6B, as in FIG. 6A, the first scan line 203A is connected to the first pixel 201A, the second scan line 203B is connected to the second pixel 201B, and the third scan line 203C is connected to the third pixel 201C. In FIG. 6B, a capacitor 291 represents a load capacitance due to the intersection portion 206 in FIG. 6A, a capacitor 292 represents a load capacitance due to the intersection portion 207 in FIG. 6A, a capacitor 293 represents a load capacitance due to the intersection portion 208 in FIG. 6A, a capacitor 294 represents a load capacitance due to the intersection portion 209 in FIG. 6A, a capacitor 295 represents a load capacitance due to the intersection portion 210 in FIG. 6A, and a capacitor 296 represents a load capacitance due to the intersection portion 211 in FIG. 6A.

As illustrated in FIG. 6B, load capacitance of the capacitor 292 and the capacitor 295 is generated with the first scan line 203A and the second scan line 203B; load capacitance of the capacitor 291 and the capacitor 294 is generated with the second scan line 203B and the third scan line 203C; load capacitance of the capacitor 293 and the capacitor 296 is generated with the first scan line 203A and the third scan line 203C. As described above, load capacitance is generated in a region where the conductive layer which forms the first to third scan lines 203A to 203C intersects with the different conductive layer in the intersection portion. Therefore, in the structure of this embodiment, the widths of the first to third scan lines 203A to 203C are made the same; thus, load capacitance can be uniform between the scan lines.

Accordingly, in the structure of this embodiment, the areas of the intersection portions formed by the first to third scan lines 203A to 203C can be the same, so that load capacitance can be uniform between the scan lines. As a result, the first to third scan lines 203A to 203C each have uniform load capacitance, whereby a scan signal can be supplied to each pixel at a desired timing. Accordingly, in a display device, signal delay due to a difference in load capacitance between wirings can be reduced.

Next, examples of specific display elements in the display element portions 205A to 205C illustrated in FIG. 6A will be described with reference to FIGS. 7A and 7B. Note that, in the description of FIGS. 7A and 7B, the structures of the elements illustrated in FIG. 6A other than the display element portions 205A to 205C are not repeatedly described.

Figure 7A:
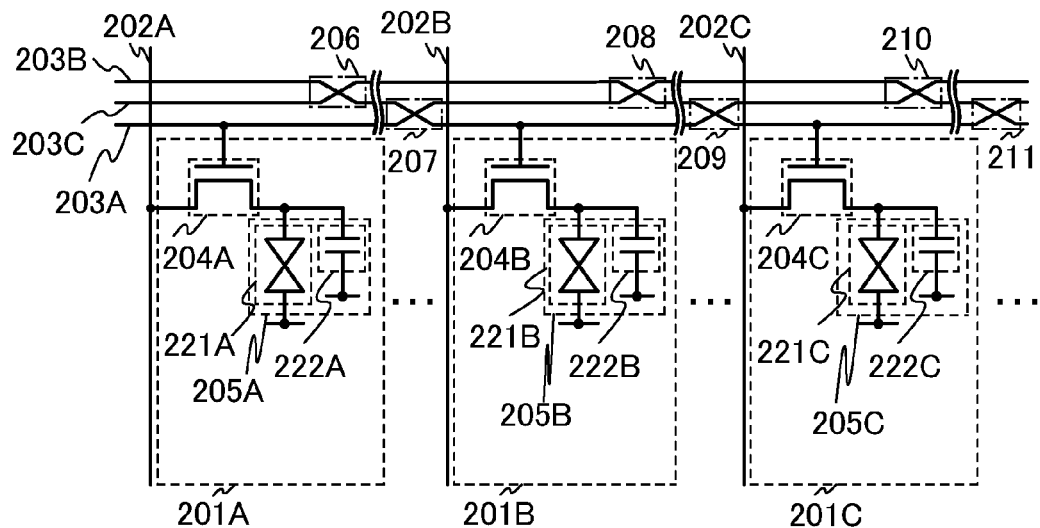
FIGS. 7A and 7B are each a circuit diagram according to one embodiment of the present invention.

A circuit diagram of FIG. 7A illustrates an example of the case where the display element portions 205A to 205C illustrated in FIG. 6A each include a liquid crystal element. The display element portion 205A illustrated in FIG. 7A includes a liquid crystal element 221A and a capacitor 222A which are connected to the other terminal (also referred to as a second terminal) which is to be a source or drain terminal of the transistor 204A. The display element portion 205B illustrated in FIG. 7A includes a liquid crystal element 221B and a capacitor 222B which are connected to the other terminal (also referred to as a second terminal) which is to be a source or drain terminal of the transistor 204B. The display element portion 205C illustrated in FIG. 7A includes a liquid crystal element 221C and a capacitor 222C which are connected to the other terminal (also referred to as a second terminal) which is to be a source or drain terminal of the transistor 204C. One electrode (also referred to as a pixel electrode or a first electrode) of each of the liquid crystal elements 221A to 221C is connected to the other terminal of each of the transistors 204A to 204C, respectively. The other electrode (also referred to as a counter electrode or a second electrode) of each of the liquid crystal elements 221A to 221C is connected to a common potential line (also referred to as a common line). One electrode (also referred to as a first electrode) of each of the capacitors 222A to 222C is connected to the other terminal of each of the transistors 204A to 204C, respectively. The other electrode (also referred to as a second electrode) of each of the capacitors 222A to 222C is connected to a capacitor line. Note that the capacitors 222A to 222C may be provided as necessary, and can be omitted.

Figure 7B:
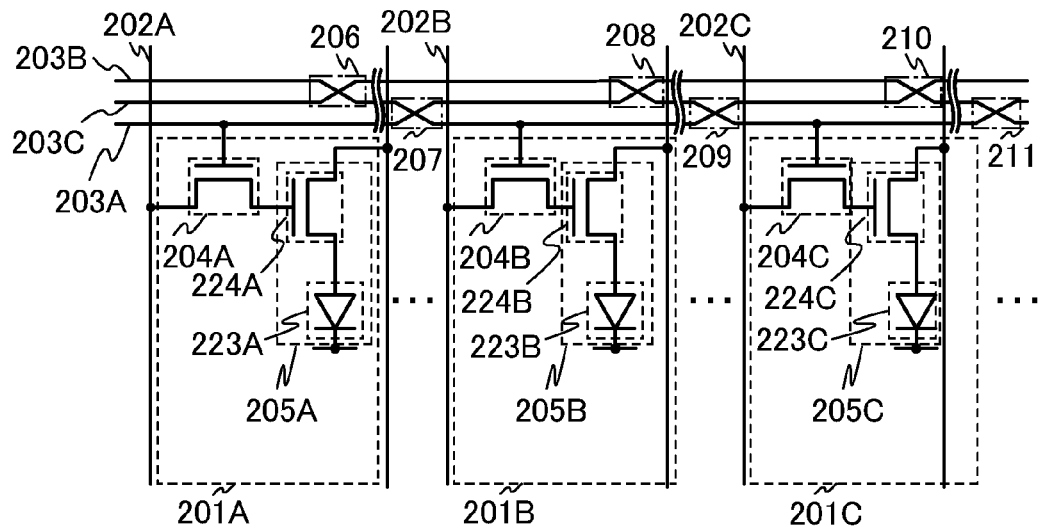

A circuit diagram of FIG. 7B illustrates an example of the case where the display element portions 205A to 205C illustrated in FIG. 6A each include a light-emitting element such as an electro luminescent (EL) element. The display element portion 205A illustrated in FIG. 7B includes a light-emitting element 223A and a transistor (also referred to as a driving transistor) 224A for driving the light-emitting element 223A. The display element portion 205B illustrated in FIG. 7B includes a light-emitting element 223B and a transistor (also referred to as a driving transistor) 224B for driving the light-emitting element 223B. The display element portion 205C illustrated in FIG. 7B includes a light-emitting element 223C and a transistor (also referred to as a driving transistor) 224C for driving the light-emitting element 223C. A gate terminal of each of the transistors 224A to 224C is connected to the other terminal of each of the transistors 204A to 204C, respectively. One terminal (also referred to as a first terminal) to be a source or drain terminal of each of the transistors 224A to 224C is connected to a current supply line (also referred to as a power supply line) for supplying current to the light-emitting elements 223A to 223C. The other terminal (also referred to as a second terminal) to be a source or drain terminal of each of the transistors 224A to 224C is connected to one electrode (also referred to as a first electrode) of each of the light-emitting elements 223A to 223C, respectively. The other electrode (also referred to as a second electrode) of each of the light-emitting elements 223A to 223C is connected to a ground line (also referred to as a common potential line). In each of the transistors 224A to 224C, a capacitor may be provided between the gate terminal and the first terminal.

As described above, a difference in load capacitance can be reduced between scan lines. As the result, scan signal delay due to the difference in load capacitance can be reduced.

This embodiment can be implemented in appropriate combination with any of the structures described in the other embodiments.

Embodiment 3

In this embodiment, an example of a field-sequential display device having the circuit configuration described in Embodiment 1 will be described with reference to FIGS. 8A to 8D, FIGS. 9A and 9B, FIGS. 10A and 10B, and FIG. 11. Note that a display device described in this embodiment is a liquid crystal display device including a liquid crystal element as a display element.

<Structural Example of Liquid Crystal Display Device>

Figure 8A:
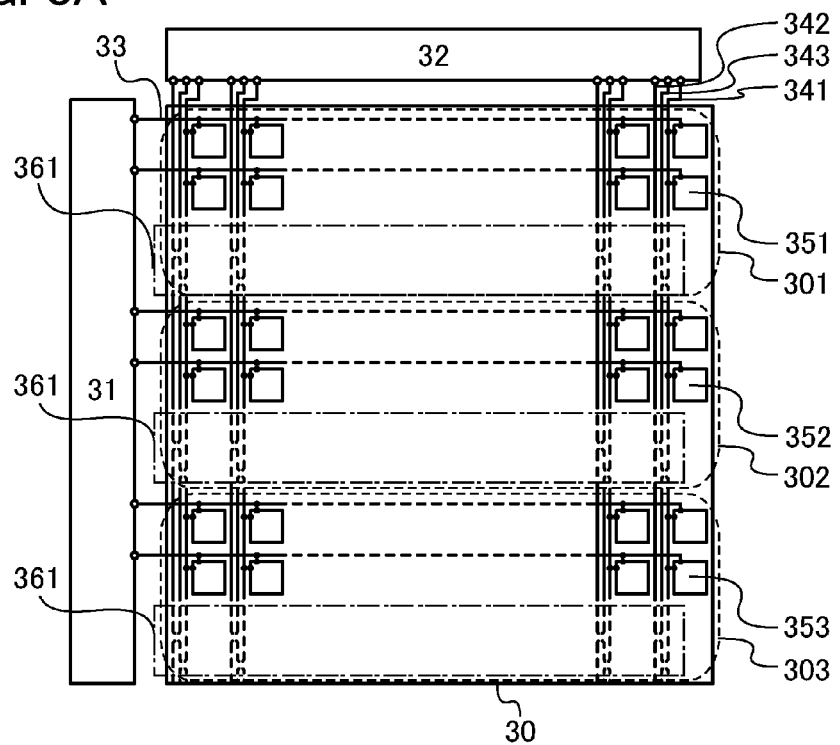
FIGS. 8A to 8D are circuit diagrams according to one embodiment of the present invention.

FIG. 8A illustrates a structural example of a liquid crystal display device. The liquid crystal display device illustrated in FIG. 8A includes a pixel portion 30; a scan line driver circuit 31; a data line driver circuit (also referred to as a signal line driver circuit) 32; 3n (n is a natural number of 2 or larger) scan lines 33 which are arranged parallel or substantially parallel to each other and whose potentials are controlled by the scan line driver circuit 31; and m (m is a natural number of 2 or larger) first data lines 341, m second data lines 342, and m third data lines 343 which are arranged parallel or substantially parallel to each other and whose potentials are controlled by the data line driver circuit 32.

The pixel portion 30 is divided into three regions (regions 301 to 303) and each region includes a plurality of pixels which is arranged in matrix (n rows by m columns). Note that each of the scan lines 33 is connected to m pixels provided in a corresponding row among the plurality of pixels arranged in matrix (3n rows by m columns) in the pixel portion 30. In addition, each of the first data lines 341 is connected to n pixels provided in a corresponding column among the plurality of pixels 351 arranged in matrix (n rows by m columns) in the region 301. Further, each of the second data lines 342 is connected to n pixels provided in a corresponding column among the plurality of pixels 352 arranged in matrix (n rows by m columns) in the region 302. Furthermore, each of the third data lines 343 is connected to n pixels provided in a corresponding column among the plurality of pixels 353 arranged in matrix (n rows by m columns) in the region 303. Note that intersection portions 361 are provided as described in Embodiment 1, and the first to third data lines 341 to 343 are provided closest to respective one terminals of transistors of pixels in the regions 301 to 303. Thus, load capacitance can be uniform between the first to third data lines 341 to 343. As a result, a video signal with a desired potential can be supplied to each pixel; therefore, deviation in the grayscale and/or signal delay due to a difference in load capacitance between data lines can be reduced.

Note that a start signal (GSP) for the scan line driver circuit, the clock signal (GCK) for the scan line driver circuit, and drive power supply potentials such as a high power supply potential and a low power supply potential are input to the scan line driver circuit 31 from the outside. Further, signals such as the start signal (SSP) for the data line driver circuit, the clock signal (SCK) for the data line driver circuit, and image signals (data1 to data3), and drive power supply potentials such as a high power supply potential and a low power supply potential are input to the data line driver circuit 32 from the outside.

Figure 8B:
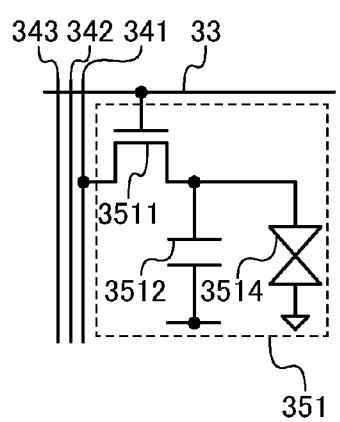
Figure 8C:
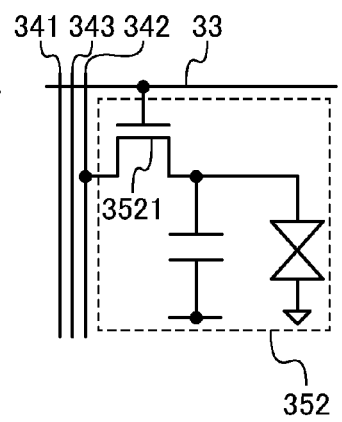
Figure 8D:
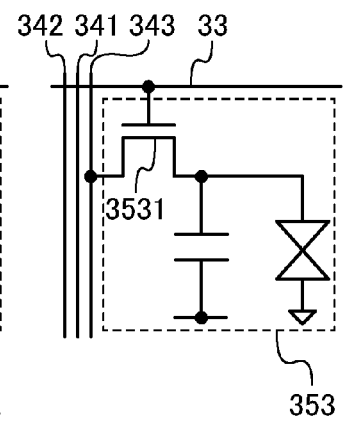

FIGS. 8B to 8D illustrate examples of circuit structures of pixels. Specifically, FIG. 8B illustrates an example of the circuit structure of a pixel 351 provided in the region 301; FIG. 8C illustrates an example of the circuit structure of a pixel 352 provided in the region 302; and FIG. 8D illustrates an example of the circuit structure of a pixel 353 provided in the region 303. The pixel 351 illustrated in FIG. 8B includes a transistor 3511, a capacitor 3512, and a liquid crystal element 3514. A gate terminal of the transistor 3511 is connected to the scan line 33. One terminal of a source and a drain of the transistor 3511 is connected to the first data line 341. One electrode of the capacitor 3512 is connected to the other terminal of the source and drain of the transistor 3511. The other electrode of the capacitor 3512 is connected to a capacitor line. One electrode (a pixel electrode) of the liquid crystal element 3514 is connected to the other terminal of the source and the drain of the transistor 3511 and one electrode of the capacitor 3512. The other electrode (a counter electrode) of the liquid crystal element 3514 is connected to a wiring for supplying a counter potential.

The circuit structures of the pixel 352 illustrated in FIG. 8C and the pixel 353 illustrated in FIG. 8D are the same as the structure of the pixel 351 illustrated in FIG. 8B. Note that the pixel 352 illustrated in FIG. 8C differs from the pixel 351 illustrated in FIG. 8B in that one of a source and a drain of a transistor 3521 is connected to the second data line 342 instead of the first data line 341; and the pixel 353 illustrated in FIG. 8D differs from the pixel 351 illustrated in FIG. 8B in that one of a source and a drain of a transistor 3531 is connected to the third data line 343 instead of the first data line 341.

<Structural Example of Scan Line Driver Circuit 31>

Figure 9A:
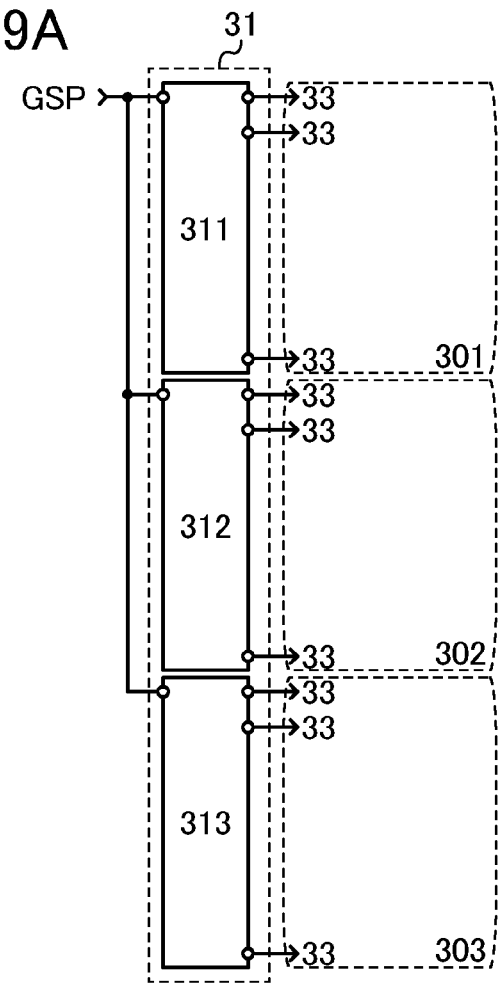
FIGS. 9A and 9B are a circuit diagram and a timing chart, respectively, according to one embodiment of the present invention.

FIG. 9A illustrates a structural example of the scan line driver circuit 31 included in the liquid crystal display device illustrated in FIG. 8A. The scan line driver circuit 31 illustrated in FIG. 9A includes shift registers 311 to 313 each including n output terminals. Note that output terminals of the shift register 311 are connected to the respective n scan lines 33 provided in the region 301. Output terminals of the shift register 312 are connected to the respective n scan lines 33 provided in the region 302. Output terminals of the shift register 313 are connected to the respective n scan lines 33 provided in the region 303. In other words, the shift register 311 supplies scan signals to the region 301; the shift register 312 supplies scan signals to the region 302; and the shift register 313 supplies scan signals to the region 303. Specifically, the shift register 311 has a function of sequentially shifting scan signals (sequentially selecting the scan lines 33 every half the period of the clock signal (GCK) for the scan line driver circuit) from the scan line 33 in a first row in response to the start pulse signal (GSP) for the scan line driver circuit that is input from the outside; the shift register 312 has a function of sequentially shifting scan signals from the scan line 33 in the (n+1)th row is respect to the start pulse signal (GSP) for the scan line driver circuit that is input from the outside; and the shift register 313 has a function of sequentially shifting scan signals from the scan line 33 in the (2n+1)th row in response to the start pulse signal (GSP) for the scan line driver circuit that is input from the outside.

<Operation Example of Scan Line Driver Circuit 31>

Figure 9B:
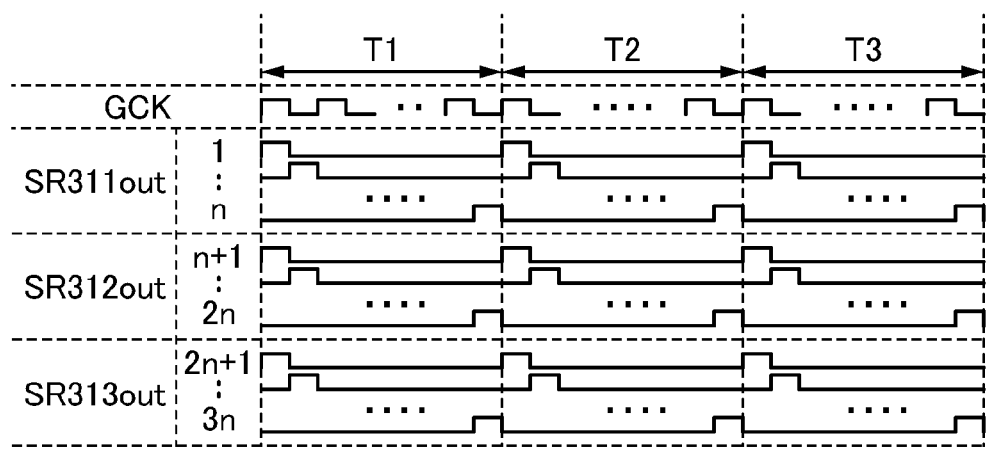

An operation example of the scan line driver circuit 31 will be described with reference to FIG. 9B. Note that FIG. 9B illustrates the clock signal (GCK) for the scan line driver circuit, signals (SR311out) output from the n output terminals of the shift register 311, signals (SR312out) output from the n output terminals of the shift register 312, and signals (SR313out) output from the n output terminals of the shift register 313.

In a sampling period (T1), high-level potentials are sequentially shifted from the scan line 33 provided in the first row to the scan line 33 provided in the n-th row every half the cycle of the clock signal (horizontal scan period) in the shift register 311; high-level potentials are sequentially shifted from the scan line 33 provided in the (n+1)th row to the scan line 33 provided in the 2n-th row every half the cycle of the clock signal (horizontal scan period) in the shift register 312; and high-level potentials are sequentially shifted from the scan line 33 provided in the (2n+1)th row to the scan line 33 provided in the 3n-th row every half the cycle of the clock signal (horizontal scan period) in the shift register 313. Therefore, in the scan line driver circuit 31, m pixels 351 provided in the first row to m pixels 351 provided in the n-th row are sequentially selected through the scan lines 33; m pixels 352 provided in the (n+1)th row to m pixels 352 provided in the 2n-th row are sequentially selected; and m pixels 353 provided in the (2n+1)th row to m pixels 353 provided in the 3n-th row are sequentially selected. In other words, in the scan line driver circuit 31, scan signals can be supplied to 3 m pixels provided in different three rows every horizontal scan period.

In a sampling period (T2) and a sampling period (T3), the operation of the shift registers 311 to 313 is the same as that in the sampling period (T1). In other words, in the scan line driver circuit 31, as in the sampling period (T1), scan signals can be supplied to 3 m pixels provided in given three rows every horizontal scan period.

<Structural Example of Data Line Driver Circuit 32>

Figure 10A:
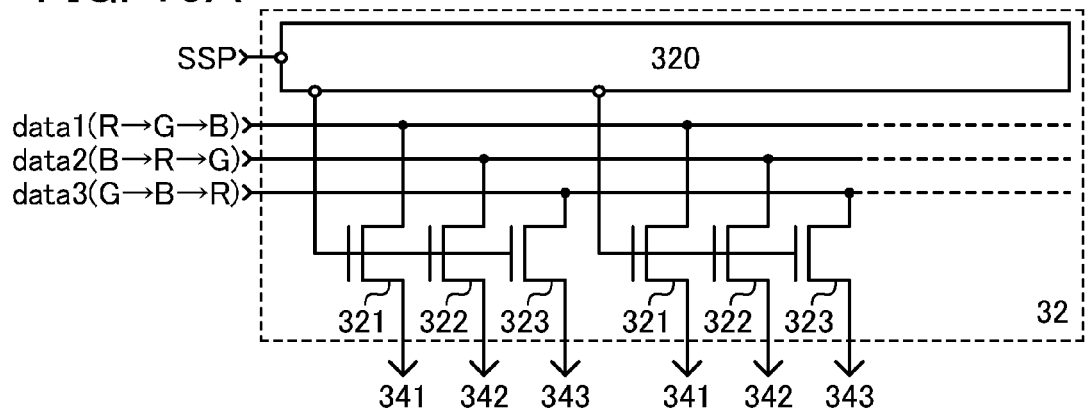
FIGS. 10A and 10B are a circuit diagram and a block diagram, respectively, according to one embodiment of the present invention.

FIG. 10A illustrates a structural example of the data line driver circuit 32 included in the liquid crystal display device illustrated in FIG. 8A. The data line driver circuit 32 illustrated in FIG. 10A includes a shift register 320 having m output terminals, m transistors 321, m transistors 322, and m transistors 323. Note that a gate terminal of the transistor 321 is connected to a j-th output terminal (j is a natural number that is 1 or larger and m or lower) of the shift register 320; one terminal of a source and a drain of the transistor 321 is connected to a wiring for supplying the first image signal (data1); and the other terminal of the source and the drain of the transistor 321 is connected to the first data line 341 provided in a j-th column in the pixel portion 30. In addition, a gate terminal of the transistor 322 is connected to the j-th output terminal (j is a natural number that is 1 or larger and m or lower) of the shift register 320; one terminal of a source and a drain of the transistor 322 is connected to a wiring for supplying the second image signal (data2); and the other terminal of the source and the drain of the transistor 322 is connected to the second data line 342 provided in the j-th column in the pixel portion 30. Further, a gate terminal of the transistor 323 is connected to the j-th output terminal (j is a natural number that is 1 or larger and m or lower) of the shift register 320; one terminal of a source and a drain of the transistor 323 is connected to a wiring for supplying the third image signal (data3); and the other terminal of the source and the drain of the transistor 323 is connected to the third data line 343 provided in the j-th column in the pixel portion 30.

Note that here, as the first image signal (data1), a red (R) image signal (an image signal held in a pixel when a backlight emits red (R) light), a green (G) image signal, and a blue (B) image signal are supplied to the first data line 341 in the sampling period (T1), the sampling period (T2), and the sampling period (T3), respectively. In addition, as the second image signal (data2), the blue (B) image signal, the red (R) image signal, and the green (G) image signal are supplied to the second data line 342 in the sampling period (T1), the sampling period (T2), and the sampling period (T3), respectively. Further, as the third image signal (data3), the green (G) image signal, the blue (B) image signal, and the red (R) image signal are supplied to the third data line 343 in the sampling period (T1), the sampling period (T2), and the sampling period (T3), respectively.

<Structural Example of Backlight>

Figure 10B:
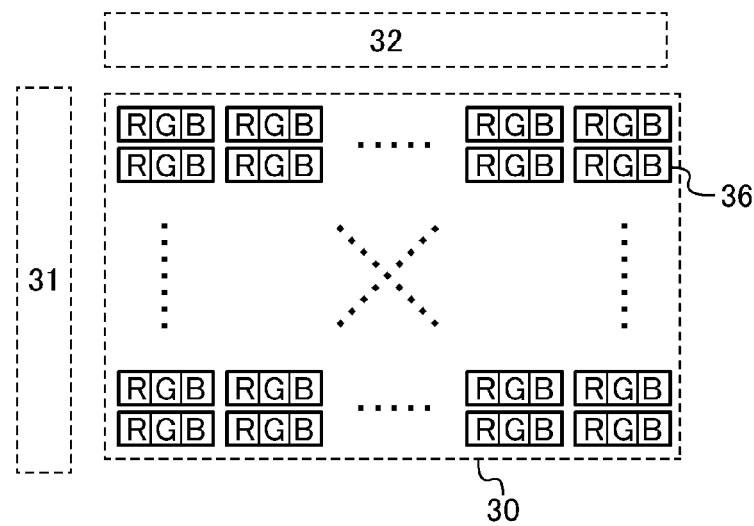

FIG. 10B illustrates a structural example of a backlight provided behind the pixel portion 30 in the liquid crystal display device illustrated in FIG. 8A. The backlight illustrated in FIG. 10B includes a plurality of backlight units 36 each including light sources of three colors of red (R), green (G), and blue (B). Note that the plurality of backlight units 36 is arranged in matrix and lighting of the backlight units 36 can be controlled every given region. Here, a backlight unit 36 is provided at least every k rows by m columns (here, k is n/4) as the backlight for the plurality of pixels provided in 3n rows by m columns. Lighting of the backlight units 36 can be controlled independently. In other words, the backlight can include at least a backlight unit group for the first to k-th rows to a backlight unit group for a (2n+3k+1)th row to the 3n-th row. Lighting of the backlight unit groups can be controlled independently.

<Operation Example of Liquid Crystal Display Device>

Figure 11:
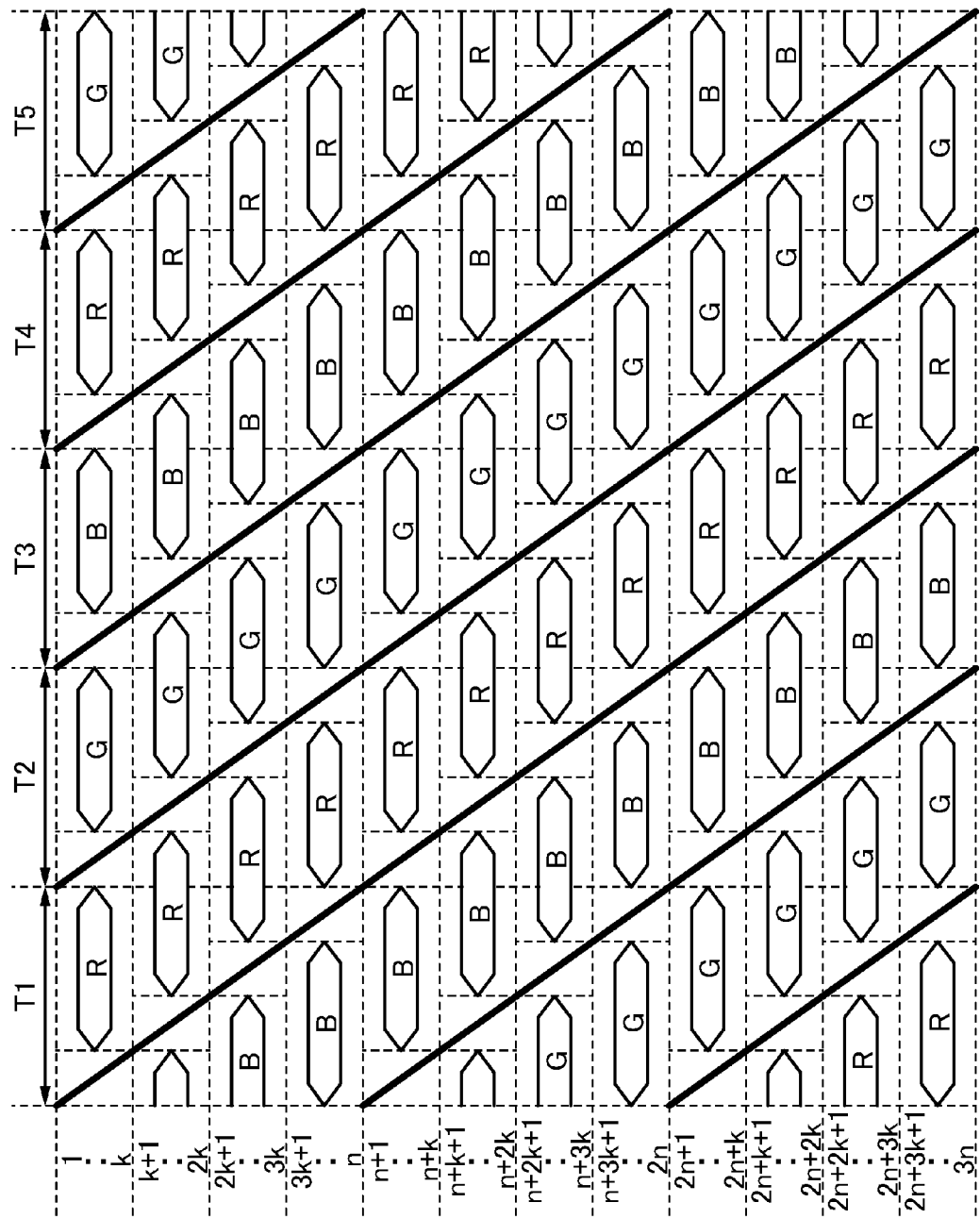
FIG. 11 is a timing chart showing one embodiment of the present invention.

FIG. 11 is a view showing scan of a scan signal in the above-mentioned liquid crystal display device and lighting timing for a backlight. In the liquid crystal display device, in the sampling period (T1), the m pixels 351 in the first row to the m pixels 351 in the n-th row are sequentially selected; the m pixels 352 in the (n+1)th row to the m pixels 352 in the 2n-th row are sequentially selected; and the m pixels 353 in the (2n+1)th row to the m pixels 353 in the 3n-th row are sequentially selected. Thus, the image signal can be input to each pixel.

As for scan of a scan signal in the liquid crystal display device illustrated in FIG. 11 and lighting timing for a backlight, scan of a scan signal and lighting of a backlight unit exhibiting a given color (red (R), green (G), or blue (B)) can be concurrently performed every region (a region in the first row to the n-th row, a region in (n+1)th row to 2n-th row, a region in (2n+1)th row to 3n-th row). In the liquid crystal display device of this embodiment, one image is produced in the pixel portion 30 by the operations in the sampling periods (T1) to (T3). That is, in the liquid crystal display device, the sampling periods (T1) to (T3) correspond to one frame period.

<Liquid Crystal Display Device of this Embodiment>

In the liquid crystal display device of this embodiment, load capacitance can be uniform between the first to third data lines 341 to 343 for which the structure described in Embodiment 1 can be employed. As a result, a video signal with a desired potential can be supplied to each pixel; therefore, deviation in the grayscale and/or signal delay due to a difference in load capacitance between data lines can be reduced.

This embodiment can be implemented in appropriate combination with any of the structures described in the other embodiments.

Embodiment 4

In this embodiment, an example of a plan view and a cross-sectional view of a pixel included in a display device, here, a liquid crystal display device will be described with reference to drawings.

Figure 12A:
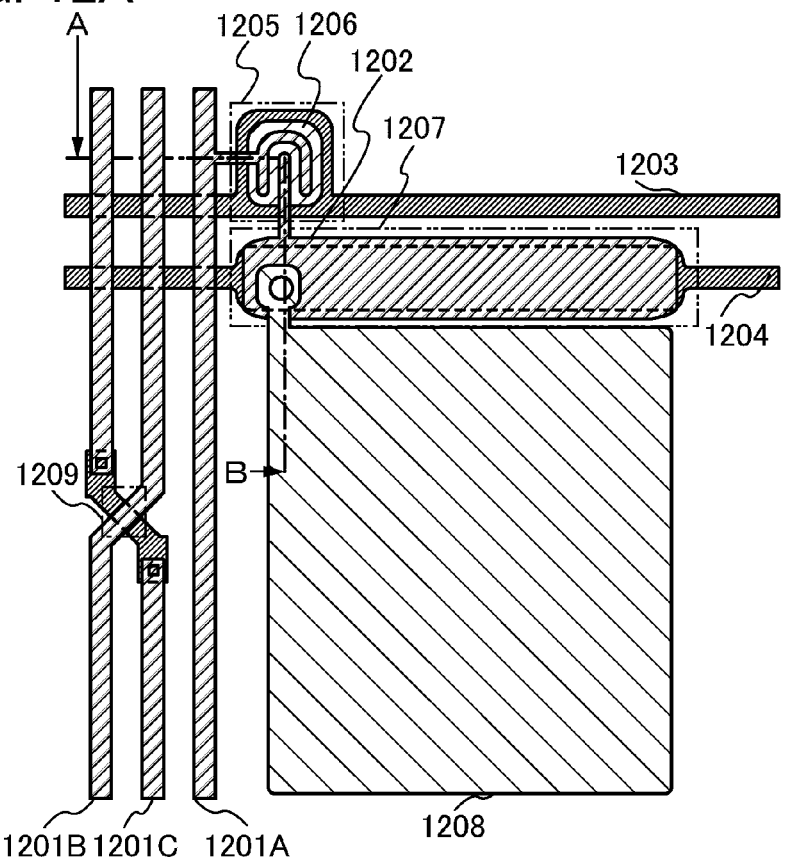
FIGS. 12A and 12B are a top view and a cross-sectional view, respectively, according to one embodiment of the present invention.
Figure 12B:
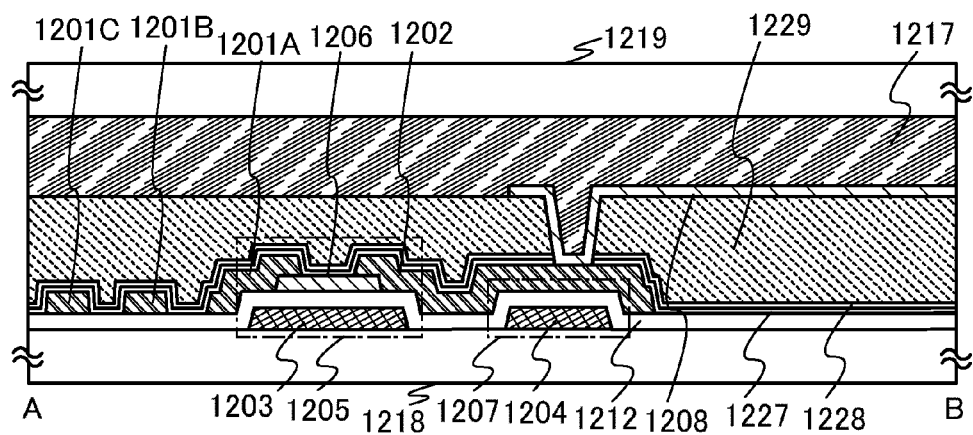

FIG. 12A is a plane view of one of a plurality of pixels included in a display panel. FIG. 12B is a cross-sectional view taken along the alternate long and short dashed line A-B in FIG. 12A.

In FIG. 12A, wiring layers (including source electrode layers 1201A to 1201C and a drain electrode layer 1202) to be the first to third data lines are extended in the vertical direction (in the column direction) in the drawing. Wiring layers (including a gate electrode layer 1203) to be scan lines are extended in the direction approximately orthogonal to the source electrode layers 1201A to 1201C (in the horizontal direction (in the row direction) in the drawing). A capacitor wiring layer 1204 is extended in the direction approximately parallel to the gate electrode layer 1203 and in the direction approximately orthogonal to the source electrode layers 1201A to 1201C (in the horizontal direction (in the row direction) in the drawing). Note that in an intersection portion 1209, the source electrode layers 1201B and 1201C intersect with each other using a wiring layer formed with the same layer as the gate electrode layer 1203 and the capacitor wiring layer 1204.

In FIG. 12A, a transistor 1205 including a gate electrode layer 1203 is formed in a pixel of the display panel. An insulating film 1227, an insulating film 1228, and an interlayer film 1229 are formed over the transistor 1205.

The pixel of the display panel illustrated in FIG. 12A and FIG. 12B includes a transparent electrode layer 1208 as a first electrode layer connected to the transistor 1205. An opening (a contact hole) is formed in the insulating film 1227, the insulating film 1228, and the interlayer film 1229 which are formed over the transistor 1205. The transparent electrode layer 1208 is connected to the transistor 1205 through the opening (contact hole).

The transistor 1205 illustrated in FIGS. 12A and 12B includes a semiconductor layer 1206 formed over the gate electrode layer 1203 with the gate insulating layer 1212 interposed therebetween; and a source electrode layer 1201A and a drain electrode layer 1202 which are in contact with the semiconductor layer 1206. A stack of the capacitor wiring layer 1204, the gate insulating layer 1212, and the drain electrode layer 1202 forms a capacitor 1207.

Further, a first substrate 1218 included in the transistor 1205 overlaps with a second substrate 1219 with a liquid crystal layer 1217 interposed therebetween.

Note that although an example of the case where a bottom-gate inverted staggered transistor is used as the transistor 1205 is illustrated in FIG. 12B, there is no particular limitation on the structure of a transistor applicable to the liquid crystal display device disclosed in this specification. For example, a top-gate transistor in which a gate electrode layer is placed on the upper side of a semiconductor layer with a gate insulating layer interposed therebetween; or a bottom-gate staggered transistor or planar transistor in which a gate electrode layer is placed on the lower side of a semiconductor layer with a gate insulating layer interposed therebetween can be used.

This embodiment can be implemented in appropriate combination with any of the structures described in the other embodiments.

Embodiment 5

In this embodiment, an example of a transistor applicable to the liquid crystal display device disclosed in this specification will be described. There is no particular limitation on a structure of the transistor applicable to the liquid crystal display device disclosed in this specification. For example, a staggered transistor, a planar transistor, or the like having a top-gate structure in which a gate electrode is placed on the upper side of a semiconductor layer with a gate insulating layer interposed therebetween or a bottom-gate structure in which a gate electrode is placed on a lower side of a semiconductor layer with a gate insulating layer interposed therebetween, can be used. The transistor may have a single gate structure including one channel formation region, a double gate structure including two channel formation regions, or a triple gate structure including three channel formation regions. Alternatively, the transistor may have a dual gate structure including two gate electrode layers placed over and below a channel region with a gate insulating layer interposed. Examples of the cross-sectional structure of a transistor are illustrated in FIGS. 13A to 13D.

Each of the transistors illustrated in FIGS. 13A to 13D uses an oxide semiconductor in its semiconductor layer. An advantage of using an oxide semiconductor is that a high field-effect mobility (the maximum value is 5 $cm^2/Vsec$ or more, preferably in the range of 10 $cm^2/Vsec$ to 150 $cm^2/Vsec$) can be obtained when a transistor is on, and a low off-state current per unit channel width (e.g., less than 1 $aA/\mu m$, preferably less than 10 $zA/\mu m$ and less than 100 $zA/\mu m$ at 85° C. per unit channel width) can be obtained when the transistor is off.

Figure 13A:
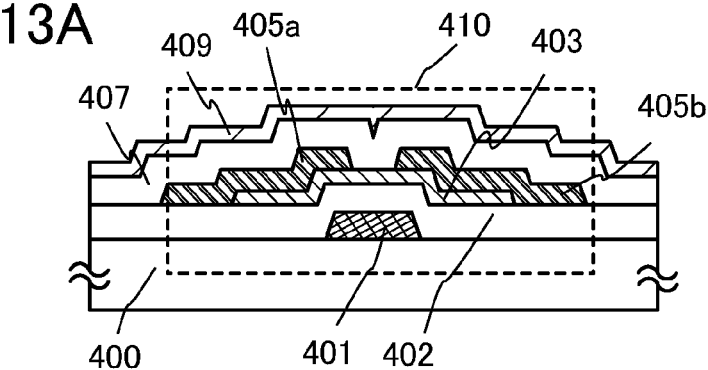
FIGS. 13A to 13D are each a cross-sectional view according to one embodiment of the present invention.

A transistor 410 illustrated in FIG. 13A is a bottom-gate transistor and is also referred to as an inverted staggered transistor.

The transistor 410 includes, over a substrate 400 having an insulating surface, a gate electrode layer 401, a gate insulating layer 402, an oxide semiconductor layer 403, a source electrode layer 405a, and a drain electrode layer 405b. An insulating film 407 is formed to cover the transistor 410 and to be stacked over the oxide semiconductor layer 403. Further, a protective insulating layer 409 is formed over the insulating film 407.

Figure 13B:
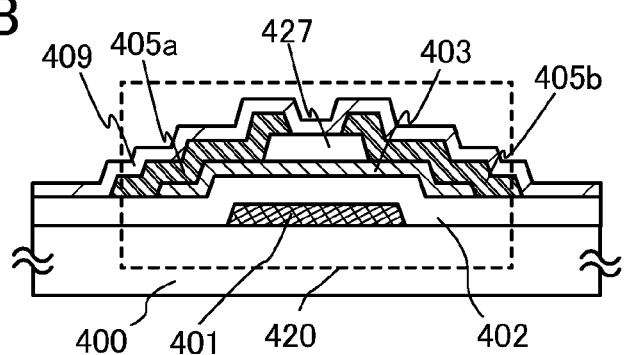

A transistor 420 illustrated in FIG. 13B is a bottom-gate transistor referred to as a channel-protective type (also referred to as a channel-stop type) transistor and is also referred to as an inverted staggered transistor.

The transistor 420 includes, over the substrate 400 having an insulating surface, the gate electrode layer 401, the gate insulating layer 402, the oxide semiconductor layer 403, an insulating layer 427 functioning as a channel protective layer covering a channel formation region of the oxide semiconductor layer 403, the source electrode layer 405a, and the drain electrode layer 405b. Further, the protective insulating layer 409 is formed to cover the transistor 420.

Figure 13C:
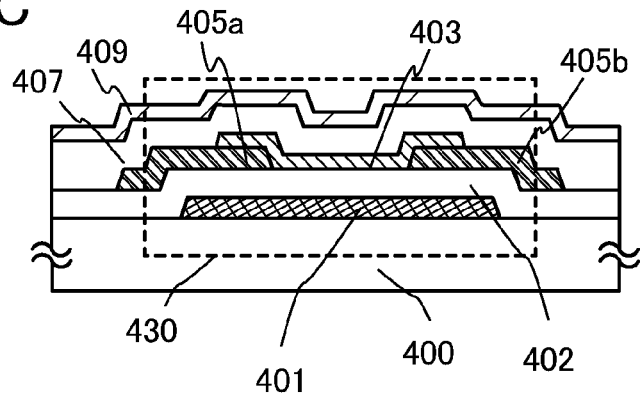

A transistor 430 illustrated in FIG. 13C is a bottom-gate transistor and includes, over the substrate 400 having an insulating surface, the gate electrode layer 401, the gate insulating layer 402, the source electrode layer 405a, the drain electrode layer 405b, and the oxide semiconductor layer 403. The insulating film 407 is formed to cover the transistor 430 and to be in contact with the oxide semiconductor layer 403. Further, the protective insulating layer 409 is formed over the insulating film 407.

In the transistor 430, the gate insulating layer 402 is formed over and in contact with the substrate 400 and the gate electrode layer 401; the source electrode layer 405a and the drain electrode layer 405b are formed over and in contact with the gate insulating layer 402. The oxide semiconductor layer 403 is formed over the gate insulating layer 402, the source electrode layer 405a, and the drain electrode layer 405b.

Figure 13D:
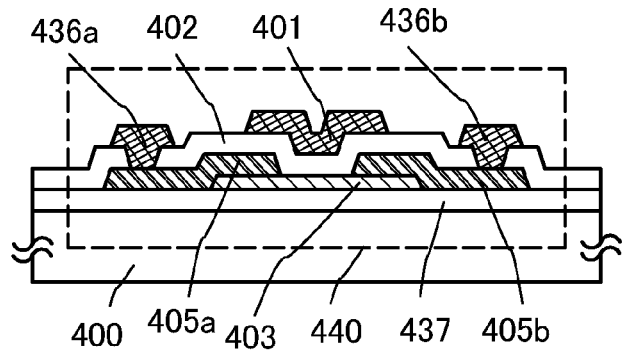

A transistor 440 illustrated in FIG. 13D is a top-gate transistor. The transistor 440 includes, over the substrate 400 having an insulating surface, an insulating layer 437, the oxide semiconductor layer 403, the source electrode layer 405a, the drain electrode layer 405b, the gate insulating layer 402, and the gate electrode layer 401. A wiring layer 436a and a wiring layer 436b are formed in contact with and are connected to the source electrode layer 405a and the drain electrode layer 405b, respectively.

In this embodiment, the oxide semiconductor layer 403 is used as a semiconductor layer as described above. Examples of an oxide semiconductor used for the oxide semiconductor layer 403 include: a four-component metal oxide such as an In—Sn—Ga—Zn—O-based oxide semiconductor; a three-component metal oxide such as an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, and a Sn—Al—Zn—O-based oxide semiconductor; a two-component metal oxide such as an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, and an In—Mg—O-based oxide semiconductor; an In—O-based oxide semiconductor; a Sn—O-based oxide semiconductor; a Zn—O-based oxide semiconductor; and an In—Ga—O-based oxide semiconductor. In addition, $SiO_2$ may be contained in the above oxide semiconductor. Here, for example, an In—Ga—Zn—O-based oxide semiconductor means an oxide film containing indium (In), gallium (Ga), and zinc (Zn), and there is no particular limitation on the stoichiometric proportion thereof. The In—Ga—Zn—O-based oxide semiconductor may contain an element other than In, Ga, and Zn.

As the oxide semiconductor layer 403, a thin film expressed by a chemical formula of $InMO_3(ZnO)_m$ (m>0) can be used. Here, M represents one or more metal elements selected from Ga, Al, Mn, and Co. For example, M can be Ga, Ga and Al, Ga and Mn, Ga and Co, or the like.

In each of the transistors 410, 420, 430, and 440 including the oxide semiconductor layer 403, the value of current in a transistor in an off state (off-state current value) can be reduced. Therefore, a capacitor for holding an electric signal such as a video signal can be designed to be small in a pixel. This enables improvement in the aperture ratio of a pixel, thereby achieving low power consumption corresponding to the improvement.

Further, since the off-state current of the transistors 410, 420, 430, and 440 including the oxide semiconductor layer 403 can be reduced, in the pixel, a holding time of an electric signal such as a video signal can be made longer and a writing interval can be set longer. Therefore, the cycle of one frame period can be made longer, and the frequency of a refresh operation performed in a still-image display period can be reduced, thereby further enhancing the effect of suppressing power consumption. In addition, since the transistors can be separately formed in a driver circuit area and a pixel area over one substrate, the number of components of the liquid crystal display device can be reduced.

There is no particular limitation on a substrate that can be applied to the substrate 400 having an insulating surface. For example, a glass substrate made of barium borosilicate glass or aluminosilicate glass can be used.

In the bottom-gate transistors 410, 420, and 430, an insulating film serving as a base film may be formed between the substrate and the gate electrode layer. The base film has a function of preventing diffusion of an impurity element from the substrate, and can be a single layer or a stacked layer including one or more of a silicon nitride film, a silicon oxide film, a silicon nitride oxide film, and a silicon oxynitride film.

The gate electrode layer 401 can be a single layer or a stacked layer including any of the following materials: metal materials such as molybdenum, titanium, chromium, tantalum, tungsten, aluminum, copper, neodymium, and scandium; and an alloy material containing any of these materials as its main component.

The gate insulating layer 402 can be a single layer or a stacked layer including any of the following: a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, and a hafnium oxide layer, and can be formed by a plasma CVD method, a sputtering method, or the like. For example, a 200-nm-thick gate insulating layer is formed in such a manner that a first gate insulating layer that is a silicon nitride layer ($SiN_y$ (y>0)) having a thickness of 50 nm to 200 nm is formed by a plasma CVD method and then a second gate insulating layer that is a silicon oxide layer ($SiO_x$ (x>0)) having a thickness of 5 nm to 300 nm is stacked over the first gate insulating layer.

As a conductive film used for the source electrode layer 405a and the drain electrode layer 405b, for example, a metal film containing an element selected from Al, Cr, Cu, Ta, Ti, Mo, and W and a metal nitride film containing any of the above elements as its component (e.g., a titanium nitride film, a molybdenum nitride film, or a tungsten nitride film) can be used. A metal film having a high melting point such as Ti, Mo, W, or the like or a metal nitride film of any of these elements (e.g., a titanium nitride film, a molybdenum nitride film, or a tungsten nitride film) may be stacked on one or both of a lower side and an upper side of a metal film of Al, Cu, or the like.

The same material as that of the source electrode layer 405a and the drain electrode layer 405b can be used for conductive films used as the wiring layers 436a and the wiring layer 436b which are connected to the source electrode layer 405a and the drain electrode layer 405b, respectively.

The conductive film to be the source electrode layer 405a and the drain electrode layer 405b (including a wiring layer formed using the same layer as the source electrode layer 405a and the drain electrode layer 405b) may be formed using conductive metal oxide. As the conductive metal oxide, indium oxide ($In_2O_3$), tin oxide ($SnO_2$), zinc oxide (ZnO), an alloy of indium oxide and tin oxide ($In_2O_3$—$SnO_2$, abbreviated to ITO), an alloy of indium oxide and zinc oxide ($In_2O_3$—ZnO), and such a metal oxide material containing silicon oxide can be used.

As the insulating films 407 and 427 being formed over the oxide semiconductor layer and as the insulating layer 437 being formed below the oxide semiconductor layer, an inorganic insulating film such as a silicon oxide film, a silicon oxynitride film, an aluminum oxide film, or an aluminum oxynitride film can be typically used.

For the protective insulating layer 409 formed over the oxide semiconductor layer, an inorganic insulating film such as a silicon nitride film, an aluminum nitride film, a silicon nitride oxide film, or an aluminum nitride oxide film can be used.

Further, a planarization insulating film may be formed over the protective insulating layer 409 so that surface roughness due to the transistor is reduced. As the planarization insulating film, an organic material such as polyimide, acrylic, and benzocyclobutene can be used. In addition to the above organic materials, a low-dielectric constant material (a low-k material) or the like can be used. Note that the planarization insulating film may be formed by stacking a plurality of insulating films of any of these materials.

As described above, the off-state current of a transistor including a highly-purified oxide semiconductor layer formed according to this embodiment can be made low. A highly-purified oxide semiconductor layer is preferable in that it can be formed without a process such as laser irradiation and formation of a transistor over a large-scale substrate can be realized.

This embodiment can be implemented in appropriate combination with any of the structures described in the other embodiments.

Embodiment 6

A display device disclosed in this specification can be applied to a variety of electronic devices (including a game machine). Examples of electronic devices are a television set (also referred to as a television or a television receiver), a screen of a computer or the like, a camera such as a digital camera or a digital video camera, a digital photo frame, a cellular phone (also referred to as a mobile phone or a cellular phone device), a portable game machine, a personal information terminal, an audio reproducing device, and a large-sized game machine such as a pachinko machine. Examples of an electronic device including the display device described in any of the above embodiments will be described.

Figure 14A:
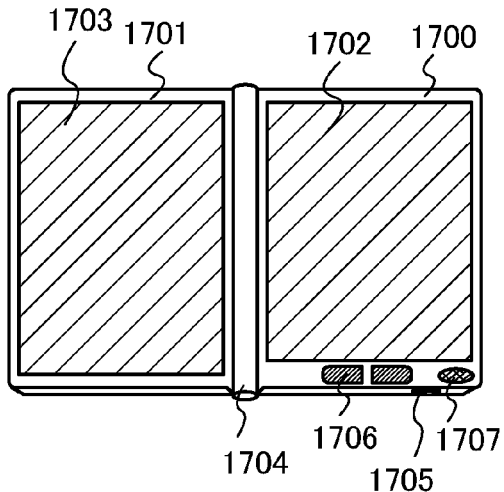
FIGS. 14A to 14D are each a view according to one embodiment of the present invention.

FIG. 14A illustrates an example of an electronic book device. The electronic book device illustrated in FIG. 14A includes two housings 1700 and 1701. The housings 1700 and 1701 are combined with a hinge 1704 so that the electronic book device can be opened and closed. With such a structure, the electronic book device can be operated like a paper book.

A display portion 1702 and a display portion 1703 are incorporated in the housing 1700 and the housing 1701, respectively. The display portion 1702 and the display portion 1703 may display one image or different images. In the case where the display portions 1702 and 1703 display different images, a display portion on the right side (the display portion 1702 in FIG. 14A) can display text and a display portion on the left side (the display portion 1703 in FIG. 14A) can display images, for example.

FIG. 14A illustrates an example of the case where the housing 1700 is provided with an operation portion and the like. For example, the housing 1700 is provided with a power input terminal 1705, operation keys 1706, a speaker 1707, and the like. It is possible to turn the pages with the operation keys 1706. Note that a keyboard, a pointing device, or the like may be provided on the surface of the housing, on which the display portion is provided. Further, an external connection terminal (an earphone terminal, a USB terminal, a terminal that can be connected to various cables such as a USB cable, or the like), a recording medium insertion portion, or the like may be provided on the back surface or the side surface of the housing. Furthermore, the electronic book device illustrated in FIG. 14A may have a function of an electronic dictionary.

Figure 14B:
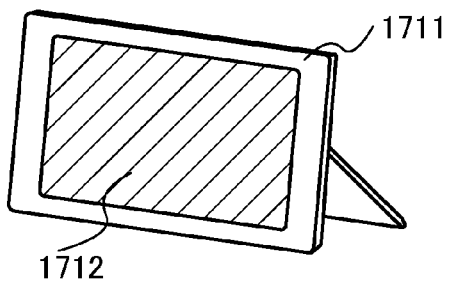

FIG. 14B illustrates an example of a digital photo frame including a display device. For example, in the digital photo frame illustrated in FIG. 14B, a display portion 1712 is incorporated in a housing 1711. The display portion 1712 can display various images. For example, the display portion 1712 can display data of an image taken with a digital camera or the like and thus function as a normal photo frame.

Note that the digital photo frame illustrated in FIG. 14B is provided with an operation portion, an external connection terminal (a USB terminal, a terminal that can be connected to various cables such as a USB cable, or the like), a recording medium insertion portion, and the like. Although these components may be provided on the surface on which the display portion is provided, it is preferable to provide them on the side surface or the back surface for the design of the digital photo frame. For example, a memory storing data of an image taken with a digital camera is inserted in the recording medium insertion portion of the digital photo frame, so that the image data can be transferred and then displayed on the display portion 1712.

Figure 14C:
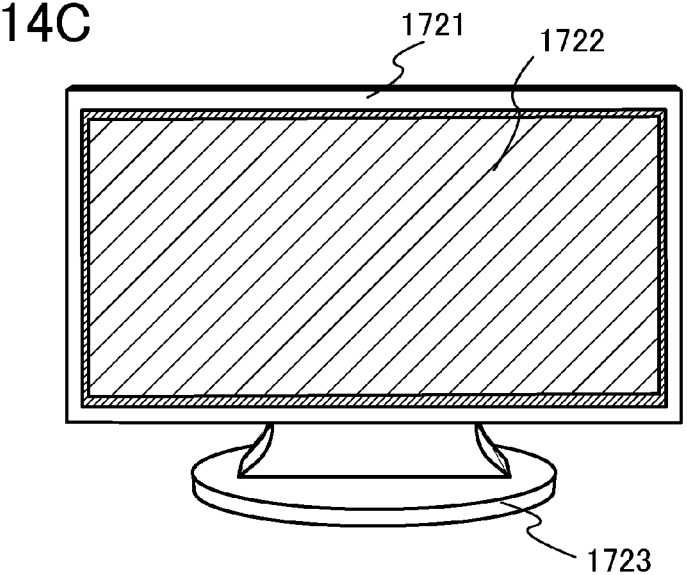

FIG. 14C illustrates an example of a television set including a display device. In the television set illustrated in FIG. 14C, a display portion 1722 is incorporated in a housing 1721. The display portion 1722 can display an image. Further, the housing 1721 is supported by a stand 1723 here. The display device described in any of the above embodiments can be applied to the display portion 1722.

The television set illustrated in FIG. 14C can be operated with an operation switch of the housing 1721 or a separate remote controller. Channels and volume can be controlled with an operation key of the remote controller so that an image displayed on the display portion 1722 can be controlled. Further, the remote controller may be provided with a display portion for displaying data output from the remote controller.

Figure 14D:
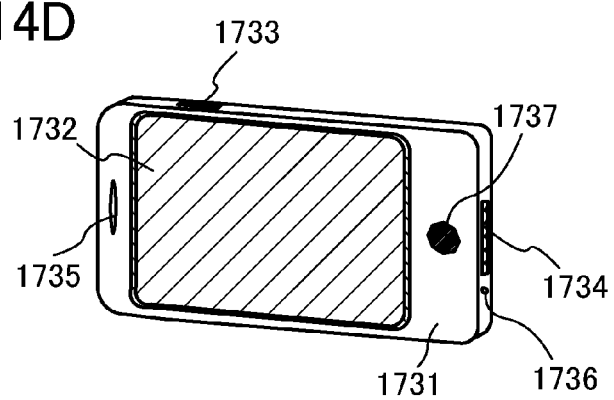

FIG. 14D illustrates an example of a cellular phone including a display device. The cellular phone illustrated in FIG. 14D is provided with a display portion 1732 incorporated in a housing 1731, an operation button 1733, an operation button 1737, an external connection port 1734, a speaker 1735, a microphone 1736, and the like.

The display portion 1732 of the cellular phone illustrated in FIG. 14D is a touch panel. When the display portion 1732 is touched with a finger or the like, contents displayed on the display portion 1732 can be controlled. Further, operations such as making calls and texting can be performed by touching the display portion 1732 with a finger or the like.

This embodiment can be implemented in appropriate combination with any of the structures described in the other embodiments.

This application is based on Japanese Patent Application serial no. 2010-129326 filed with Japan Patent Office on Jun. 4, 2010, the entire contents of which are hereby incorporated by reference.

What is claimed is:

1. A display device comprising:
   first to N-th data lines, wherein N is a natural number of 3 or larger; and
   first to N-th selection transistors,
   wherein the first to N-th data lines partially overlap and intersect with each other so that each one of the first to N-th data lines is provided closest to a corresponding one of the first to N-th selection transistors and electrically connected to one of a source and a drain of the corresponding one of the first to N-th selection transistors.

2. The display device according to claim 1, wherein each of wiring resistances of the first to N-th data lines caused by the partial overlapping and intersection of the first to N-th data lines is substantially the same.

3. The display device according to claim 2, further comprising a scan line, wherein an intersection portion between the first to N-th data lines includes a conductive layer that consists of the same material as the scan line.

4. The display device according to claim 2, wherein the first to N-th data lines are configured to supply different video signals.

5. The display device according to claim 1, further comprising a display element that includes a liquid crystal element, wherein the display element is electrically connected to the other of the source and the drain of the first to N-th selection transistors.

6. The display device according to claim 1, further comprising a display element that includes a light-emitting element and a driving transistor for driving the light-emitting element, wherein the display element is electrically connected to the other of the source and the drain of the first to N-th selection transistors.

7. An electronic device comprising the display device according to claim 1.

8. A display device comprising:
   first to N-th scan lines, wherein N is a natural number of 3 or larger; and
   first to N-th selection transistors,
   wherein the first to N-th scan lines partially overlap and intersect with each other so that each one of the first to N-th scan lines is provided closest to a corresponding one of the first to N-th selection transistors and electrically connected to a gate of the corresponding one of the first to N-th selection transistors.

9. The display device according to claim 8, wherein each of wiring resistances of the first to N-th scan lines caused by the partial overlapping and intersection of the first to N-th scan lines is substantially the same.

10. The display device according to claim 8, further comprising a display element that includes a liquid crystal element, wherein the display element is electrically connected to one of a source and a drain of the first to N-th selection transistors.

11. The display device according to claim 8, further comprising a display element that includes a light-emitting element and a driving transistor for driving the light-emitting element, wherein the display element is electrically connected to one of a source and a drain of the first to N-th selection transistors.

12. An electronic device comprising the display device according to claim 8.

* * * * *